US010101896B2

(12) United States Patent
Yamamoto

(10) Patent No.: US 10,101,896 B2
(45) Date of Patent: Oct. 16, 2018

(54) REMOTE CONTROL DEVICE OF HEAT PUMP SYSTEM

(71) Applicant: DAIKIN INDUSTRIES, LTD., Osaka-shi, Osaka (JP)

(72) Inventor: Ryousuke Yamamoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/663,498

(22) Filed: Jul. 28, 2017

(65) Prior Publication Data

US 2017/0329507 A1 Nov. 16, 2017

Related U.S. Application Data

(62) Division of application No. 15/102,497, filed as application No. PCT/JP2014/082124 on Dec. 4, 2014, now Pat. No. 9,830,065.

(30) Foreign Application Priority Data

Dec. 12, 2013 (JP) ................................ 2013-257111

(51) Int. Cl.
*G06F 3/041* (2006.01)
*G06F 3/0484* (2013.01)
(Continued)

(52) U.S. Cl.
CPC .......... *G06F 3/04847* (2013.01); *F24F 11/30* (2018.01); *F24F 11/62* (2018.01);
(Continued)

(58) Field of Classification Search
CPC ............. F24F 11/006; F24F 2011/0058; G24F 11/0086
(Continued)

(56) References Cited

U.S. PATENT DOCUMENTS

2005/0119794 A1 6/2005 Amundson et al.
2006/0192021 A1 8/2006 Schultz et al.
(Continued)

FOREIGN PATENT DOCUMENTS

GB 2 441 221 A 2/2008
JP 2003-287268 A 10/2003
(Continued)

OTHER PUBLICATIONS

Supplementary European Search Report of corresponding EP Application No. 14 87 0286.3 dated Aug. 1, 2017.
International Search Report of corresponding PCT Application No. PCT/JP2014/082124 dated Mar. 10, 2015.
International Preliminary Report of corresponding PCT Application No. PCT/JP2014/082124 dated Jun. 23, 2016.

*Primary Examiner* — Calvin C Ma
(74) *Attorney, Agent, or Firm* — Global IP Counselors, LLP

(57) ABSTRACT

A remote control device of a heat pump system is useable to switch an operating state of the heat pump system. The remote control device includes a touch screen and physical keys provided separately from the touch screen. The touch screen is configured and arranged to display a plurality of touch keys displayed by words, graphics, or symbols associated separately with any of a plurality of set items. The physical keys include at least two function keys. A number of the function keys is fewer than a number of the touch keys. The function keys are assigned a common function utilized when the operating state is switched. The remote control device further includes a common function setting part configured and arranged to assign the common functions to the function keys.

3 Claims, 26 Drawing Sheets

(51) Int. Cl.
   *F24F 11/30* (2018.01)
   *F24F 11/62* (2018.01)
   *G08C 17/02* (2006.01)
   *F25B 13/00* (2006.01)
   *G06F 3/0488* (2013.01)
   *F24F 11/77* (2018.01)
   *F24F 11/83* (2018.01)
   *F24F 11/56* (2018.01)
   *F24F 11/52* (2018.01)
   *F24F 11/61* (2018.01)

(52) U.S. Cl.
   CPC .............. *F24F 11/77* (2018.01); *F24F 11/83* (2018.01); *F25B 13/00* (2013.01); *G06F 3/0416* (2013.01); *G06F 3/04842* (2013.01); *G06F 3/04886* (2013.01); *G08C 17/02* (2013.01); *H05K 999/99* (2013.01); *F24F 11/52* (2018.01); *F24F 11/56* (2018.01); *F24F 11/61* (2018.01); *G08C 2201/20* (2013.01); *G08C 2201/30* (2013.01)

(58) Field of Classification Search
   USPC .................................. 700/726; 345/173, 174
   See application file for complete search history.

(56) References Cited

U.S. PATENT DOCUMENTS

| | | | |
|---|---|---|---|
| 2006/0219799 A1 | 10/2006 | Schultz et al. | |
| 2007/0228182 A1 | 10/2007 | Wagner et al. | |
| 2012/0012662 A1* | 1/2012 | Leen ................... | F24F 11/0012 236/51 |
| 2012/0191257 A1 | 7/2012 | Corcoran et al. | |
| 2012/0232703 A1* | 9/2012 | Moore ................ | F24F 11/0086 700/278 |
| 2012/0256843 A1 | 10/2012 | Epple et al. | |
| 2012/0271460 A1* | 10/2012 | Rognli ............... | G05D 23/1934 700/276 |
| 2013/0090767 A1* | 4/2013 | Bruck ................ | F24F 11/0086 700/276 |

FOREIGN PATENT DOCUMENTS

| | | |
|---|---|---|
| JP | 2011-185471 A | 9/2011 |
| JP | 2013-2717 A | 1/2013 |
| JP | 2013-76493 A | 4/2013 |
| JP | 2013-102446 A | 5/2013 |
| KR | 10-2009-0024462 A | 3/2009 |

* cited by examiner

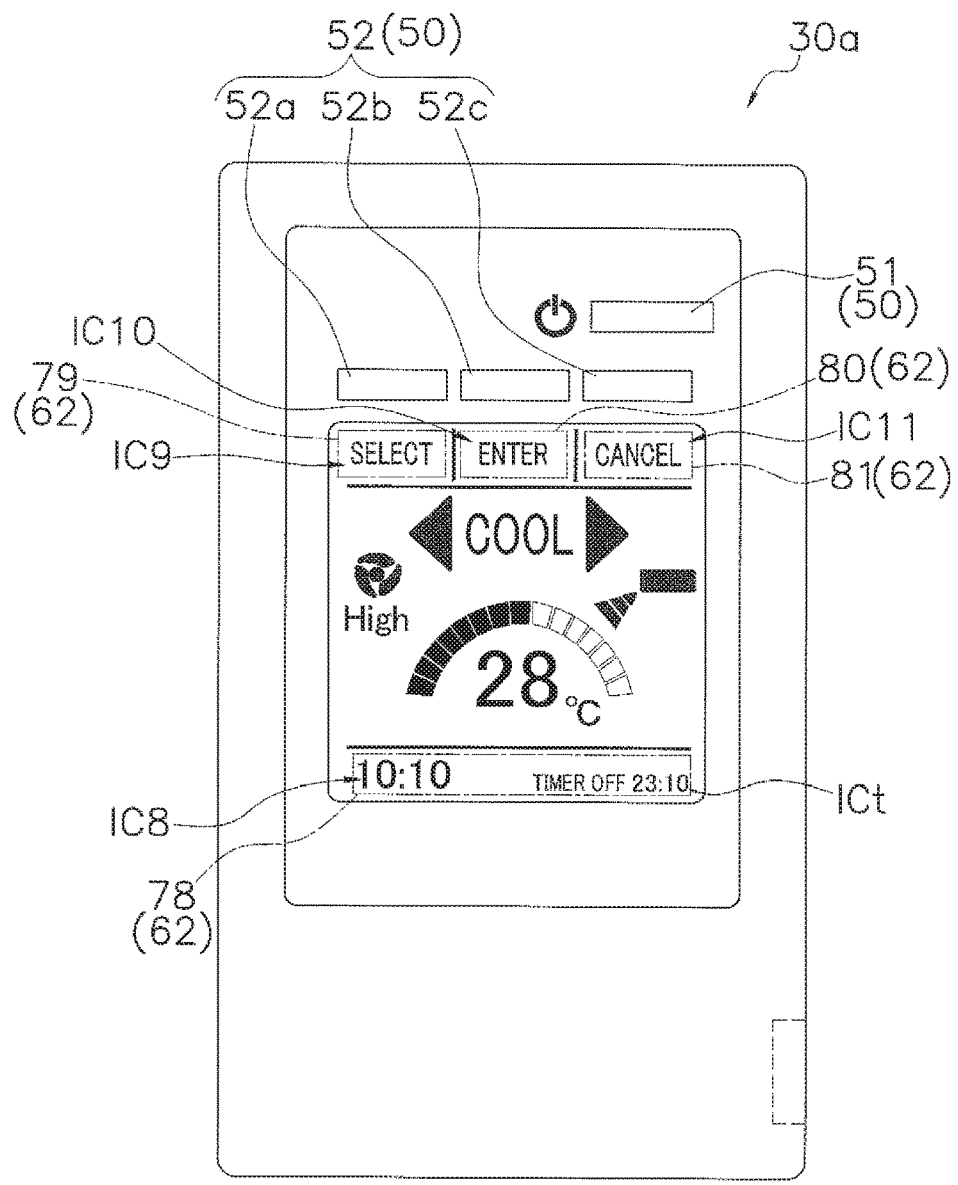
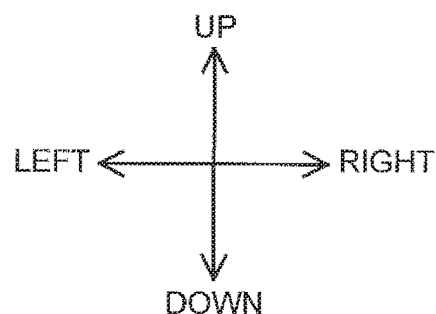
FIG. 25

REMOTE CONTROL DEVICE OF HEAT PUMP SYSTEM

CROSS-REFERENCE TO RELATED APPLICATIONS

This application is a divisional application of U.S. patent application Ser. No. 15/102,497 filed on Jun. 7, 2016, which is a National Stage application of International Patent Application No. PCT/JP2014/082124 filed on Dec. 4, 2014. The entire disclosure of U.S. patent application Ser. No. 15/102,497 is hereby incorporated herein by reference.

The present invention relates to a remote control device of a heat pump system.

BACKGROUND ART

In the past there have been remote control devices that comprise a touch screen operated to switch the operating state of a heat pump system. For example, Japanese Laid-open Patent Application Nos. 2013-076493 and 2013-002717 both disclose a remote control device for air conditioning system, comprising a touch screen intended to make the device easier to operate for a user.

SUMMARY

It is common for workers to wear gloves when manufacturing, constructing, repairing, or otherwise dealing with a heat pump system. With a remote control device such as that of Japanese Laid-open Patent Application No. 2013-076493, it is not easy for such workers to satisfactorily operate the touch screen while wearing gloves, but work efficiency decreases if the workers remove their gloves every time they operate the touch screen.

When the device has a touch screen and many physical keys are also provided as in Japanese Laid-open Patent Application No. 2013-002717, there is little degree of freedom in the design, and the remote control device inevitably must be of larger size.

In view of this, an object of the present invention is to provide a remote control device that is easily operated, highly compact, and superior in terms of design.

A remote control device of a heat pump system according to a first aspect of the present invention is a remote control device useable to switch an operating state of the heat pump system, the remote control device including a touch screen, physical keys provided separately from the touch screen, and a common function setting part configured and arranged to assign the common functions to the function keys. The touch screen is configured and arranged to display a plurality of touch keys displayed by words, graphics, or symbols associated separately with any of a plurality of set items. The physical keys includes at least two function keys. A number of the function keys is fewer than a number of the touch keys. The function keys is assigned a common function utilized when the operating state is switched. The common function setting part is further configured and arranged to select any of the common functions from a storage part in which the plurality of different common functions are stored, and to assign the common function to one of the function keys.

In the remote control device of a heat pump system according to the first aspect of the present invention, the physical keys include two or more function keys, the number of which is fewer than the number of the touch keys. Also, each of the function keys is assigned the common function that is generically utilized when the operating state is switched. Due to this, it is restrained that operability, compactness, and design become worse.

Because each of the function keys is assigned the common function, the operator is provided with various operating methods, rather than there being only one function available with each function key. As a result, it is possible to freely switch the operating state and/or implement the desired settings, even when a user operates the keys while wearing gloves, by operating the function keys without operating the touch keys. Due to this, it is restrained that operability become worse. Also, due to there being fewer function keys than touch keys, it is restrained that compactness and design become worse for increasing the number of function keys. Moreover, the user can select the common functions assigned to the function keys as desired. As a result, the operating degree of freedom is even greater.

The term "heat pump system" refers to an air conditioning system, a water heater, or the like having a refrigerant circuit. The term. "set item" refers to an item for switching the operating state of the heat pump system, indicating, e.g., the operating mode of the air conditioning system, the set temperature, the set airflow volume, airflow direction, timer setting, or another item.

A remote control device according to a second aspect of the present invention is the remote control device according to the fourth aspect, wherein the storage part is an external storage device provided to the exterior. The common function setting part is connected with the external storage device via a connecting part for connecting the external storage device.

In the remote control device according to the second aspect of the present invention, the common function setting part is connected with the external storage device via the connecting part for connecting the external storage device. The assigning of the common functions to the function keys can thereby be performed easily.

A remote control device according to a third aspect of the present invention is the remote control device according to any of the first through fifth aspects, wherein the common function is any of a first common function, a second common function, a third common function, a fourth common function, and a fifth common function. The first common function is a function for entering the selection of the set item. The second common function is a function for canceling the selection of the set item. The third common function is a function for moving from the selected set item to another set item. The fourth common function is a function for displaying help information to assist the user. The fifth common function is a function for selecting to start or end an energy conserving operation.

In the remote control device according to the third aspect of the present invention, the common function is any of the first common function, the second common function, the third common function, the fourth common function, and the fifth common function. As these common functions, the first through fifth common functions are functions that can be intuitively understood by the operator. Consequently, the operator can operate the function keys to easily switch the operating state and/or implement the desired settings.

BRIEF DESCRIPTION OF THE DRAWINGS

FIG. 25 is a schematic view showing a remote control device according to Modification M.

DESCRIPTION OF EMBODIMENTS

Figure 26:
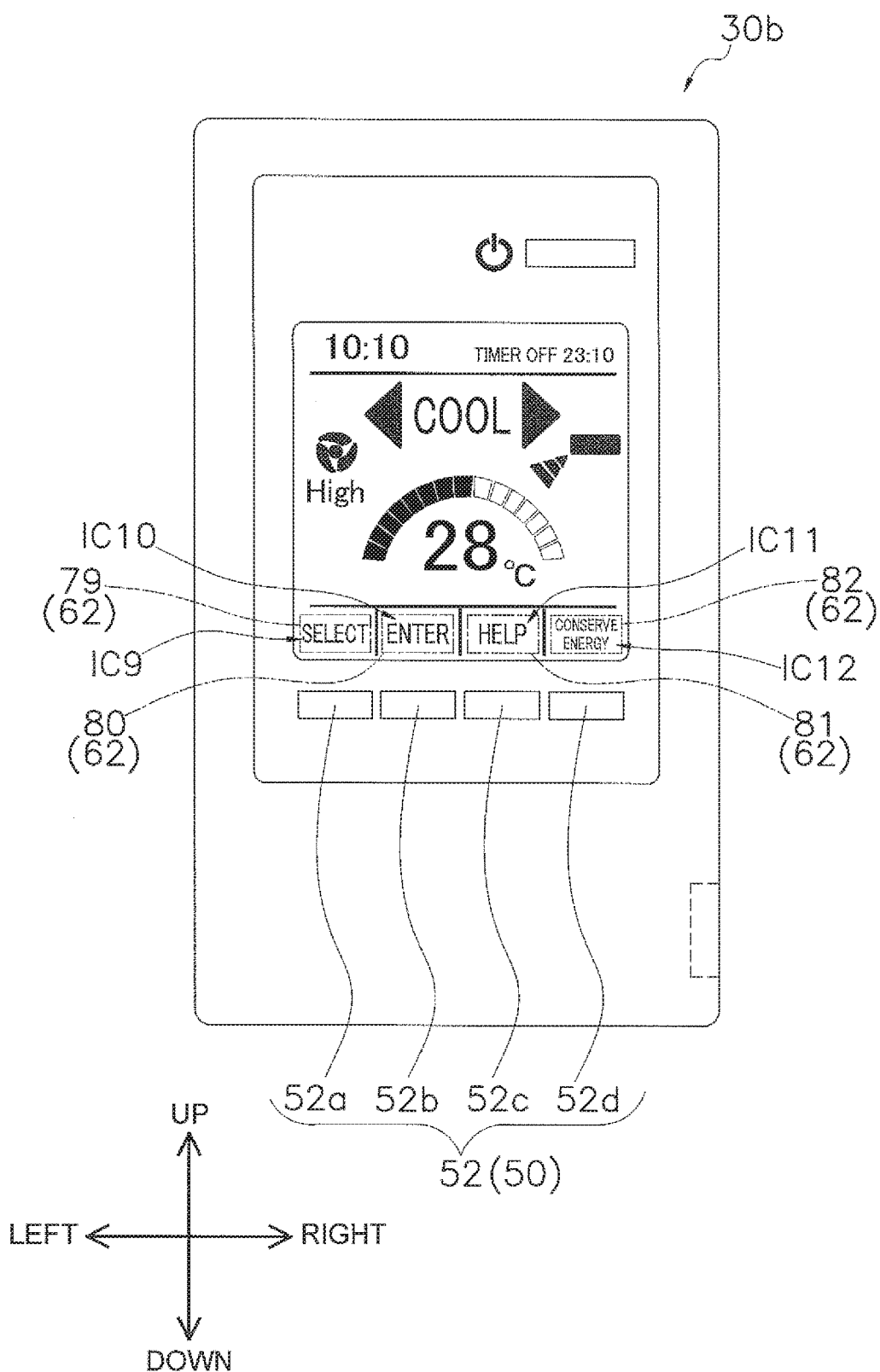
FIG. 26 is a schematic view showing a remote control device according to Modification N.

A remote control device 30 according to an embodiment of the present invention is described below with reference to the drawings. The following embodiment is a specific example and is not intended to limit the technical range of the present invention, and can be altered as appropriate within a range that does not deviate from the scope of the invention. In the following embodiment, the directions up, down, left, and right refer to the directions indicated in FIGS. 2, 25, and 26.

(1) Air Conditioning System 100

Figure 1:
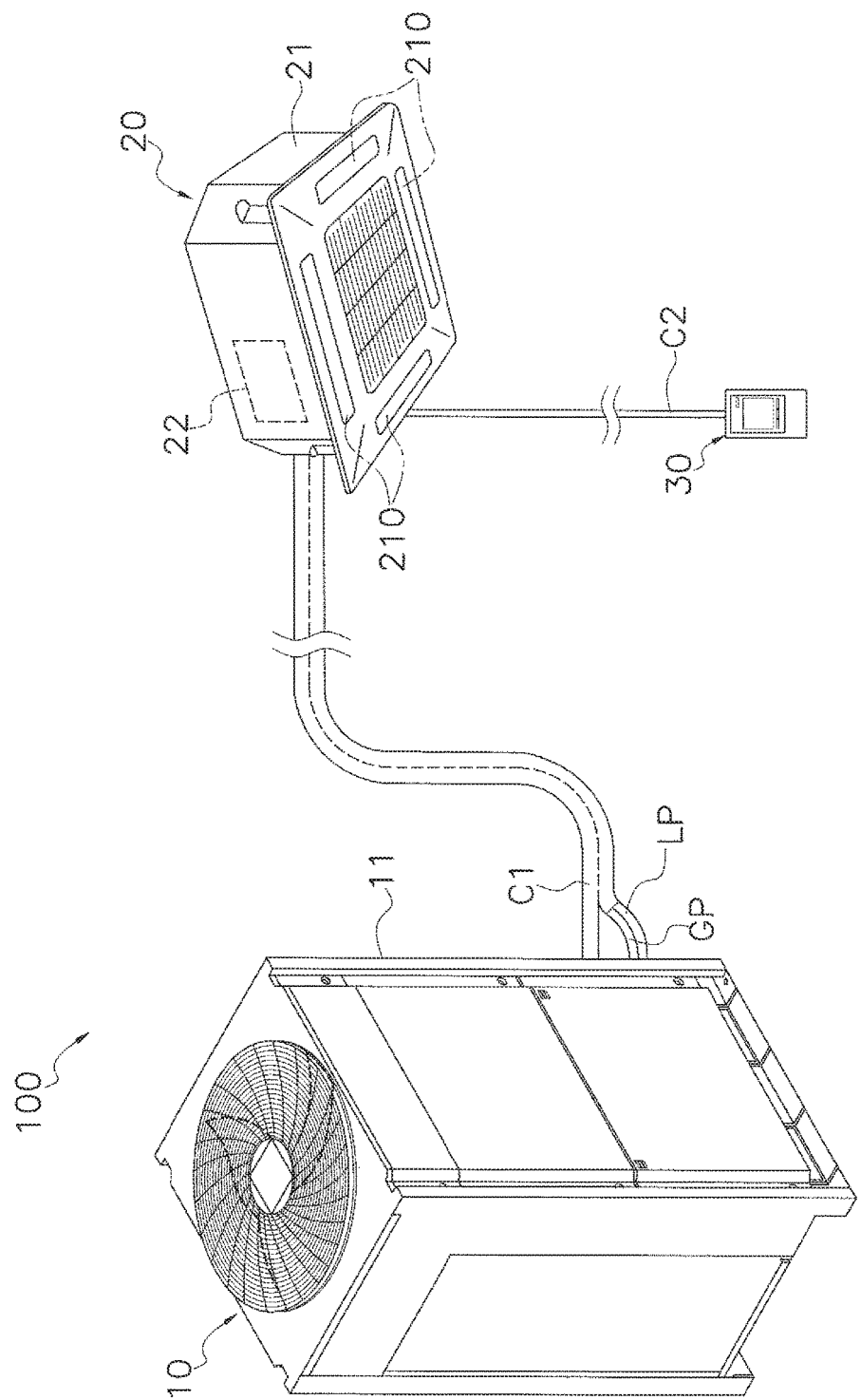
FIG. 1 is a schematic configuration drawing of an air conditioning system to which a remote control device according to an embodiment of the present invention is applied.

FIG. 1 is a schematic configuration drawing of an air conditioning system 100, one example of a heat pump system, to which the remote control device 30 is applied. The air conditioning system 100 is a refrigerant-pipe air-conditioning system and conditions the air in a target space by performing a vapor-compression refrigeration cycle operation. The air conditioning system 100 has an air-cooling mode, an air-warming mode, a dehumidifying mode, and the like as operating modes. The air conditioning system 100 performs an air-cooling operation, air-warming operation, dehumidifying operation, or the like in accordance with the selected operating mode.

The air conditioning system 100 comprises primarily an outdoor unit 10, an indoor unit 20, a gas communication pipe GP, a liquid communication pipe LP, and the remote control device 30. These components are described in order below.

(2) Details of Air Conditioning System 100

(2-1) Outdoor Unit 10

The outdoor unit 10 is installed outdoors. The contour of the outdoor unit 10 is configured by an outdoor unit casing 11. The interior of the outdoor unit casing 11 accommodates primarily an outdoor heat exchanger, an outdoor fan, a compressor, various valves (a four-way switching valve, an expansion valve, and/or the like), an outdoor unit controller, and other components (not shown).

The outdoor heat exchanger is, e.g., a cross-fin-type fin-and-tube heat exchanger, to which the gas communication pipe GP and the liquid communication pipe LP are connected. The outdoor heat exchanger functions as a condenser of refrigerant during the air-cooling operation, and functions as an evaporator of refrigerant during the air-warming operation. The outdoor fan is an air blower for creating an air flow that flows into the outdoor unit casing 11, passes through the outdoor heat exchanger, and then flows out of the outdoor unit casing 11. The compressor is, e.g., a scroll, screw, or other type of positive displacement compressor. The compressor draws in and compresses refrigerant, and then discharges the refrigerant.

The outdoor unit controller is a microcomputer configured from a CPU, memory, and/or the like. The outdoor unit controller is connected with an indoor unit controller 22 via a cable C1, and the outdoor unit controller sends and receives signals. The outdoor unit controller receives predetermined signals from the indoor unit controller 22, and thereby performs actions corresponding to these signals.

For example, upon receiving an operation start signal (described hereinafter) from the indoor unit controller 22, the outdoor unit controller makes opening degree adjustments to, and/or performs switching of the various valves and starts the driving of the compressor and the outdoor fan, in order to start the operation designated by the operation start signal. Upon receiving an operation stop signal (described hereinafter) from the indoor unit controller 22, the outdoor unit controller stops the driving of the outdoor fan and the compressor and makes opening degree adjustments to, and/or performs switching of to the various valves, in order to stop the operation. Upon receiving an operation switch signal (described hereinafter) or a set temperature switch signal (described hereinafter) from the indoor unit controller 22, the outdoor unit controller performs switching of, and/or makes opening degree adjustments to the valves, a switch to the rotational speed of the compressor, and other changes in order to perform the operation designated by the signal.

(2-2) Indoor Unit 20

In the present embodiment, the indoor unit 20 is a so-called ceiling-embedded or ceiling-suspended unit, and is secured to, e.g., the ceiling of a room. The contour of the indoor unit 20 is configured by an indoor unit casing 21.

Blow-out ports 210 for emitting an airflow are formed in the indoor unit casing 21, and the blow-out ports 210 are fitted with flaps for adjusting the airflow direction. There are three airflow directions that can be selected in the present embodiment: up, middle, and down. Also accommodated within the indoor unit casing 21 are, primarily, an indoor heat exchanger (not shown), an indoor fan (not shown), the indoor unit controller 22, and other components.

The indoor heat exchanger is, e.g., a cross-fin-type fin-and-tube heat exchanger, to which the gas communication pipe GP and the liquid communication pipe LP are connected. The indoor heat exchanger functions as an evaporator of refrigerant during the air-cooling operation, and functions as a condenser of refrigerant during the air-warming operation.

The indoor fan is an air blower for creating an airflow that flows into the indoor unit casing 21, passes through the indoor heat exchanger, and then flows out of the indoor unit casing 21. The volume of the airflow created is switched in increments by adjusting the rotational speed of the indoor fan. In the present embodiment, the indoor fan is configured so that the set airflow volume is switched among three levels: high, medium, and low.

The indoor unit controller 22 is a microcomputer configured from a CPU, memory, and/or the like. The indoor unit controller 22 is connected with the outdoor unit controller via the cable C1, through which power is supplied and the mutual exchange of signals is conducted. The indoor unit controller 22 is also connected with a remote control device controller 90 (described hereinafter) via a cable C2, through which power is supplied and the mutual exchange of signals is conducted. Upon receiving predetermined signals from the outdoor unit controller or the remote control device controller 90, the indoor unit controller 22 performs actions corresponding to these signals.

For example, upon receiving the operation start signal (described hereinafter) from the remote control device controller 90, the indoor unit controller 22 transmits the operation start signal to the outdoor unit controller according to a predetermined protocol, and opens the flaps and starts the driving of the indoor fan in order to start the operation designated by the operation start signal. Upon receiving the operation stop signal (described hereinafter) from the remote control device controller 90, the indoor unit controller 22 transits the operation stop signal to the outdoor unit controller according to a predetermined protocol, and stops the driving of the indoor fan and closes the flaps in order to stop the operation of the indoor unit 20.

Upon receiving the operation switch signal (described hereinafter) or the set temperature switch signal (described hereinafter) from the remote control device controller 90, the indoor unit controller 22 transmits the signal to the outdoor unit controller according to a predetermined protocol. Upon receiving an airflow direction switch signal (described hereinafter), the indoor unit controller 22 drives the flaps to the airflow direction designated in the signal. Upon receiving an airflow volume switch signal (described hereinafter), the indoor unit controller 22 switches the rotational speed of the indoor fan to the airflow volume designated in the signal.

(2-3) Gas Communication Pipe GP, Liquid Communication Pipe LP

The gas communication pipe GP and the liquid communication pipe LP are, e.g., copper refrigerant pipes. The gas communication pipe GP primarily communicates gas refrigerant. The liquid communication pipe LP primarily communicates liquid refrigerant. In the air conditioning system 100, the refrigerant circuit is configured by the gas communication pipe GP and the liquid communication pipe LP connecting the outdoor unit 10 and the indoor unit 20.

(2-4) Remote Control Device 30

Figure 2:
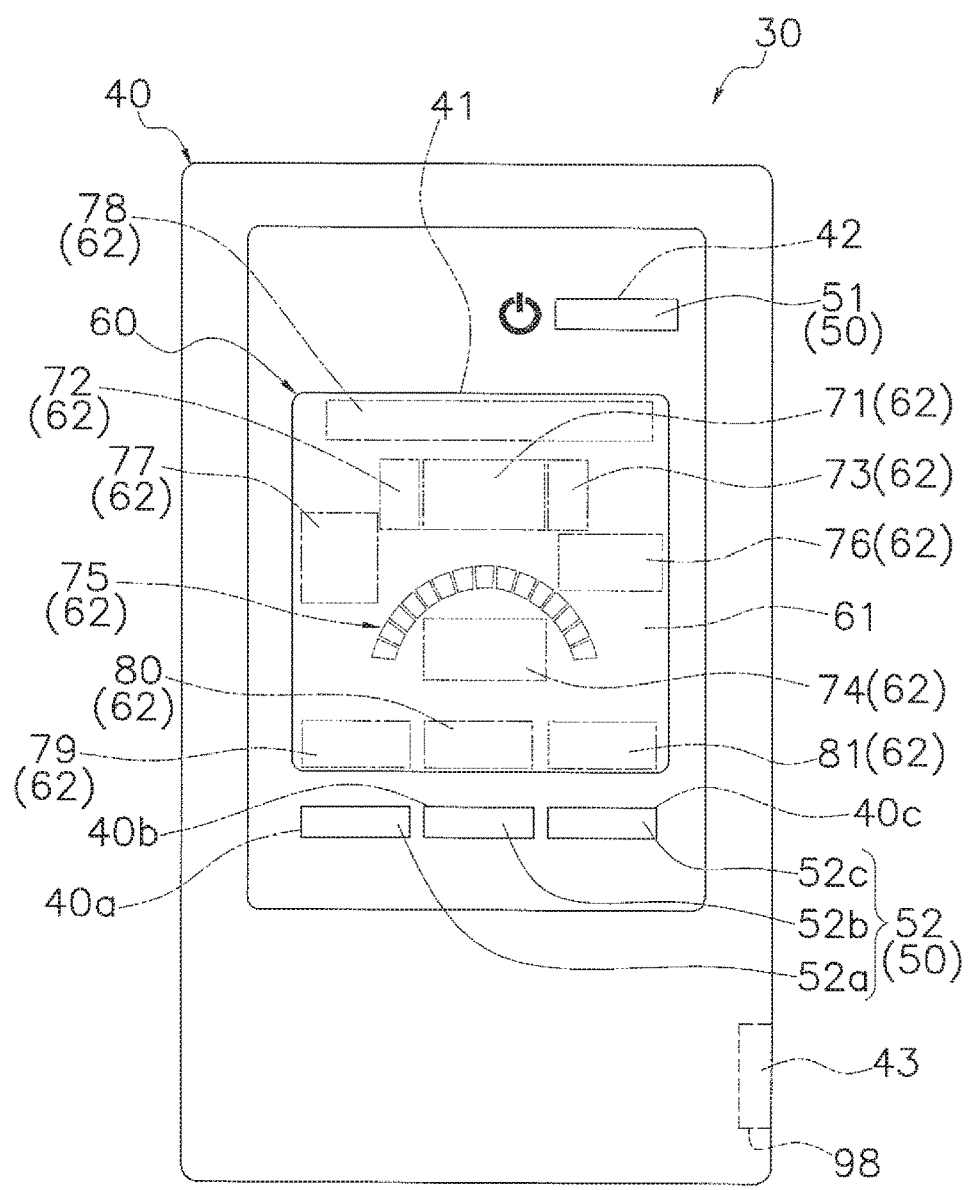
FIG. 2 is an external view of the remote control device in a front view (during use).
Figure 3:
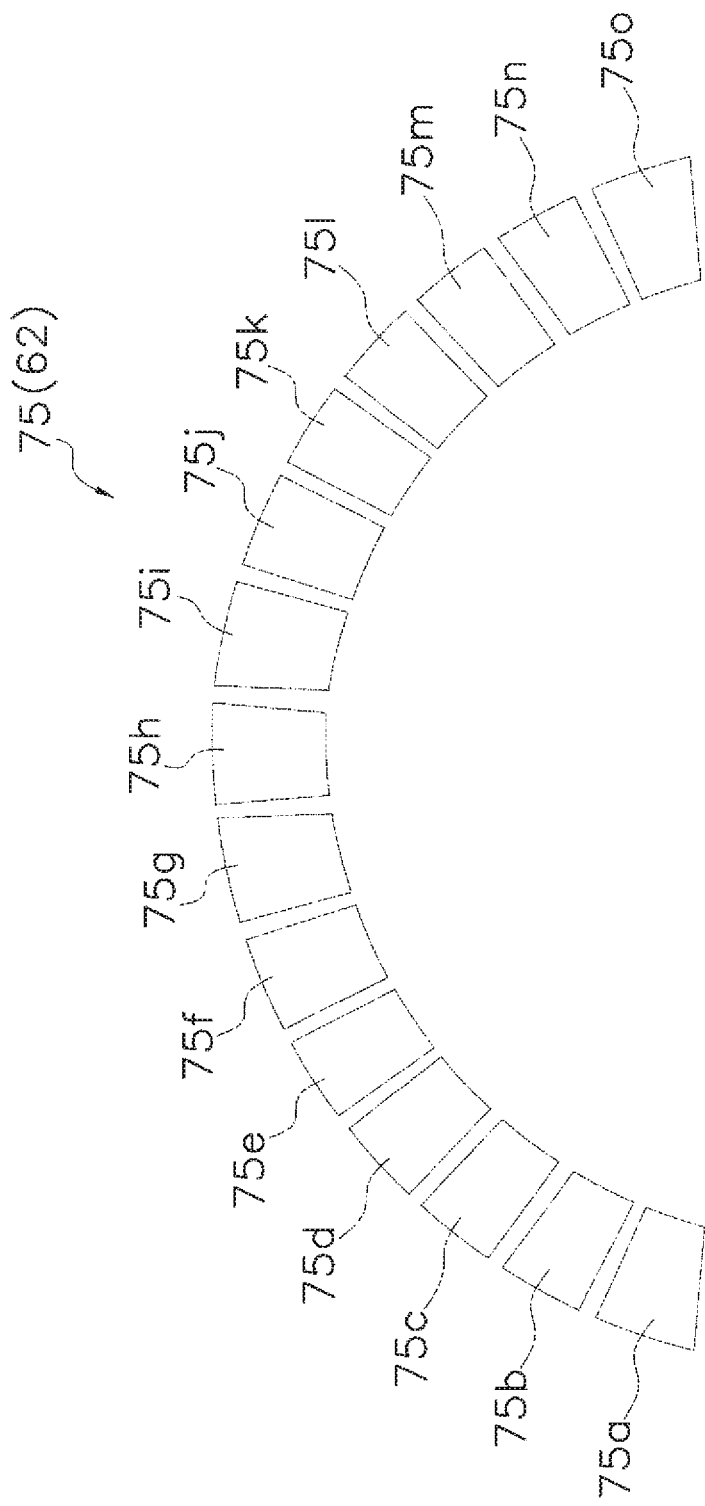
FIG. 3 is an enlarged view of a fifth touch input part.
Figure 4:
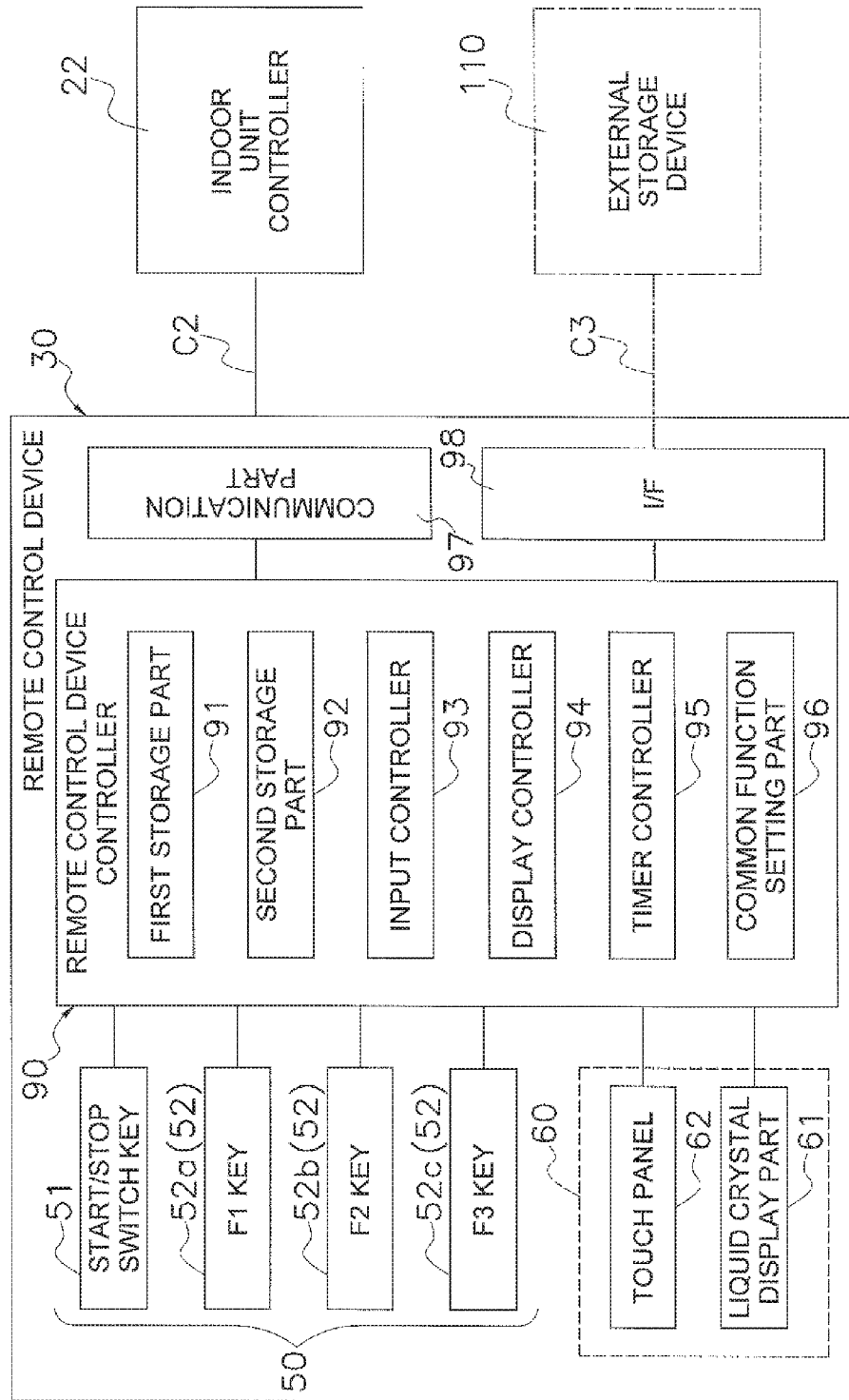
FIG. 4 is a schematic configuration drawing of the remote control device.

FIG. 2 is an external view of the remote control device 30 in a front view (during use). FIG. 3 is an enlarged view of a fifth touch input part 75. FIG. 4 is a schematic configuration drawing of the remote control device 30.

In the present embodiment, the remote control device 30 is a so-called wired remote control device, and is connected with the indoor unit controller 22 via the cable C2 as described above. The remote control device 30 is secured to, e.g., a wall surface or the like in a room. The remote control device 30 functions as an input device with which the user inputs various instructions for switching the operating state of the air conditioning system 100. More specifically, the remote control device 30 functions as an interface for inputting to the air conditioning system 100 instructions for switching, e.g., the operating mode, set temperature, set airflow volume, airflow direction, timer settings, and other setting items of the air conditioning system 100. The remote control device 30 also functions as a display device on which the operating state of the air conditioning system 100 is displayed.

The remote control device 30 has a casing 40 constituting the contour. The remote control device 30 has physical keys 50 as input means, a touch screen 60 as an input means and a display means, the remote control device controller 90, a communication part 97, and an interface 98 as a connector to external devices in the casing 40.

(2-4-1) Casing 40

The casing 40 is a thin case made of, e.g., a synthetic resin. The casing has a substantially rectangular shape in a front view (during use). A central opening 41 through which the touch screen 60 is exposed is formed in a central portion of the main surface on one side of the casing 40. An upper opening 42 through which a start/stop switch key 51 (described hereinafter) is formed above the central opening 41 in the casing 40. A first opening 40a, a second opening 40b, and a third opening 40c through which key tops of function keys 52 (described hereinafter) are exposed are formed directly below the central opening 41 in the casing 40. Furthermore, a lower opening 43 through which the interface 98 is exposed is formed in the right-side surface near the bottom edge of the casing 40.

(2-4-2) Physical Keys 50

The physical keys 50 are push buttons that the user pushes to input instructions. The physical keys 50 have key tops made of, e.g., a synthetic resin, and the key tops are exposed through the openings (42, 40a, 40b, and 40c) formed in the casing 40. The physical keys 50 include primarily the start/stop switch key 51 and the plurality of function keys 52.

The start/stop switch key 51 is a button for inputting an operation start instruction or an operation stop instruction for starting or stopping the operation of the air conditioning system 100.

In the present embodiment, the function keys 52 include a first function key 52a (referred to below as the F1 key 52a), a second function key 52b (referred to below as the F2 key 52b), and a third function key 52c (referred to below as the F3 key 52c). Each of the function keys 52 is button that is assigned generically utilized common function when the operating state of the air conditioning system 100 is switched, and is used when these common function is utilized. The common functions are described later in "(3) Details of common functions assigned to respective function keys 52."

When pushed, the physical keys 50 output predetermined signals to the remote control device controller 90. Specifically, the start/stop switch key 51, when pushed, outputs a start/stop switch signal to the remote control device controller 90 and stores the signal in a second storage part 92 (described hereinafter). Similarly, the F1 key 52a, when pushed, outputs an F1 input signal to the remote control device controller 90 and stores the signal in the second storage part 92. The F2 key 52b, when pushed, outputs an F2 input signal to the remote control device controller 90 and stores the signal in the second storage part 92. The F3 key 52c, when pushed, outputs an F3 input signal to the remote control device controller 90 and stores the signal in the second storage part 92.

(2-4-3) Touch Screen 60

The touch screen 60 includes primarily a liquid crystal display part 61 as a display means, and a touch panel 62 as an input means.

(2-4-3-1) Liquid Crystal Display Part 61

In the present embodiment, the liquid crystal display part 61 has a full-dot matrix liquid crystal display panel and an LED backlight of three primary colors. The liquid crystal display part 61 is able, by changing output, to switch backlight brightness between two levels; i.e., high and low, and to switch the backlight color among three patterns; i.e., blue, green, and red.

Upon receiving a display data signal (described hereinafter) outputted from the remote control device controller 90, the liquid crystal display part 61 illuminates the backlights and displays a predetermined image with the brightness and colors designated by the display data signal. The liquid crystal display part 61 stops the display upon receiving a display stop signal (described hereinafter) outputted from the remote control device controller 90.

(2-4-3-2) Touch Panel 62

The touch panel 62 is an input panel which employs any of various systems including, e.g., a capacitance system, an electromagnetic induction system, a resistance film system, an ultrasonic system, an infrared system, or the like. The touch panel 62 is arranged on the front-surface side (during use) of the liquid crystal display part 61, and is exposed through the central opening 41. To be more detailed, the touch panel 62 includes a plurality of touch input parts. Specifically, in an arrangement configuration such as that shown in FIG. 2, the touch panel 62 includes a first input part 71, a second touch input part 72, a third touch input part 73, a fourth touch input part 74, a fifth touch input part 75, a sixth touch input part 76, a seventh touch input part 77, an eighth touch input part 78, a ninth touch input part 79, a tenth touch input part 80, and an eleventh touch input part 81.

The first through fourth touch input parts 71 to 74 and the sixth through eleventh touch input parts 76 to 81 are quadrangular. The fifth touch input part 75 is configured from a group of substantially quadrangular fifth touch input parts 75a to 75o, as shown in FIG. 3. The fifth touch input part 75 has an arched shape in which the fifth touch input parts 75a to 75o are arranged in a curve. The ninth touch input part 79 is arranged directly above the F1 key 52a, the tenth touch input part 80 is arranged directly above the F2 key 52b, and the eleventh touch input part 81 is arranged directly above the F3 key 52c.

When any of the first through eleventh touch input parts 71 to 81 is touched with a finger, a stylus pen, or the like, the touch panel 62 detects the touch and outputs to the remote control device controller 90 a touch signal corresponding to the touch input part that was touched.

Specifically, when the first touch input part 71 is touched, the touch panel 62 outputs a first touch signal to the remote control device controller 90 and stores the signal in the second storage part 92. Similarly, when the second touch input part 72 is touched, the touch panel 62 outputs a second touch signal to the remote control device controller 90 and stores the signal in the second storage part 92; when the third touch input part 73 is touched, a third touch signal; when the fourth touch input part 74 is touched, a fourth touch signal; when the sixth touch input part 76 is touched, a sixth touch signal; when the seventh touch input part 77 is touched, a seventh touch signal; when the eighth touch input part 78 is touched, an eighth touch signal; when the ninth touch input part 79 is touched, a ninth touch signal; when the tenth touch input part 80 is touched, a tenth touch signal; and when the eleventh touch input part 81 is touched, an eleventh touch signal.

When the fifth touch input part 75a is inputted, the touch panel 62 outputs a fifth touch signal (a) to the remote control device controller 90 and stores the signal in the second storage part 92. Similarly, when the fifth touch input part 75b is inputted, the touch panel 62 outputs a fifth touch signal (b) to the remote control device controller 90 and stores the signal in the second storage part 92; when the fifth touch input part 75c is inputted, a fifth touch signal (c) is outputted; when the fifth touch input part 75d is inputted, a fifth touch signal (d) is outputted; when the fifth touch input part 75e is inputted, a fifth touch signal (e) is outputted; when the fifth touch input part 75f is inputted, a fifth touch signal (f) is outputted; when the fifth touch input part 75g is inputted, a fifth touch signal (g) is outputted; when the fifth touch input part 75h is inputted, a fifth touch signal (h) is outputted; when the fifth touch input part 75i is inputted, a fifth touch signal (i) is outputted; when the fifth touch input part 75j is inputted, a fifth touch signal (j) is outputted; when the fifth touch input part 75k is inputted, a fifth touch signal (k) is outputted; when the fifth touch input part 75l is inputted, a fifth touch signal (l) is outputted; when the fifth touch input part 75m is inputted, a fifth touch signal (m) is outputted; when the fifth touch input part 75n is inputted, a fifth touch signal (n) is outputted; and when the fifth touch input part 75o is inputted, a fifth touch signal (o) is outputted.

(2-4-4) Remote Control Device Controller 90

The remote control device controller 90 is a microcomputer configured from a CPU, memory, and/or the like. The remote control device controller 90 is connected with the indoor unit controller via the cable C2, through which the supply of power is received and the exchange of signals is conducted. The remote control device controller 90 is connected via wiring with the start/stop switch key 51, the F1 key 52*a*, the F2 key 52*b*, the F3 key 52*c*, and the touch screen 60 (the liquid crystal display part 61 and the touch panel 62).

The remote control device controller 90 includes primarily a first storage part 91, a second storage part 92, an input controller 93, a display controller 94, a timer controller 95, and a common function setting part 96.

(2-4-4-1) First Storage Part 91

The first storage part 91 keeps control programs applied in the various parts of the remote control device controller 90. A plurality of control modes (standby mode, operation switch mode, set temperature switch mode, airflow direction switch mode, airflow volume switch mode, timer setting mode, set item selection mode, common function assignment mode, etc.) are defined and the processes pertaining to these modes are programmed in the control programs.

Specifically, standby mode is a control mode applied during standby. Operation switch mode is applied when the operation mode is being set. Set temperature switch mode is applied when the set temperature is switched. Airflow direction switch mode is applied when the airflow direction is switched. Airflow volume switch mode is applied when the set airflow volume is switched. Timer setting mode is applied when the timer is set. Set item selection mode is applied when a set item for which a switch is made is selected by a function key 52 or a function touch key (described hereinafter). Common function assignment mode is applied when a common function stored in an external storage device 110 or another external instrument is assigned (set) to the function keys 52.

(2-4-4-2) Second Storage Part 92

The second storage part 92 stores the start/stop switch signal, the F1 input signal, the F2 input signal, and the F3 input signal outputted from the physical keys 50, as well as the touch signals (the first through eleventh touch signals and the fifth touch signal (a)-(o)) outputted from the touch panel 62, in respective predetermined areas. The second storage part 92 also keeps information pertaining to the operating state of the air conditioning system 100 (operating mode, set temperature, set airflow volume, airflow direction). This information pertaining to the operating state is overwritten when new instructions are inputted.

(2-4-4-3) Input Controller 93

The input controller 93 acquires the start/stop switch signal, the F1 input signal, the F2 input signal, the F3 input signal, and touch signal stored in the second storage part 92, and performs a predetermined process in accordance with the control program stored in the first storage part 91. The process of the input controller 93 is described later in "(4) Details of process of remote control device controller 90."

(2-4-4-4) Display Controller 94

The display controller 94 receives a predetermined signal outputted from the input controller 93, the timer controller 95, or the common function setting part 96, creates the corresponding display data signal or the display stop signal, and outputs the created signal to the liquid crystal display part 61. The display data signal is information including data to be displayed on the liquid crystal display part 61. The display stop signal is a signal instructing the liquid crystal display part 61 to stop presenting a display. The control of the display controller 94 is described later in "(4) Details of process of remote control device controller 90."

(2-4-4-5) Timer Controller 95

The timer controller 95 receives a timer off signal (described hereinafter) outputted from the input controller 93, and when the set time designated in the timer off signal arrives, the timer controller creates the operation stop signal to stop the operation of the air conditioning system 100, and outputs the operation stop signal to the display controller 94 and the communication part 97.

(2-4-4-6) Common Function Setting Part 96

The common function setting part 96 performs a predetermined process when a USB memory or another external storage device 110 (described hereinafter) is connected. The details of the process of the common function setting part 96 are described later in "(4-8) Process during common function assignment mode."

(2-4-5) Communication Part 97

The communication part 97 receives a predetermined signal outputted from the input controller 93 and transmits this signal to the indoor unit controller 22 according to a predetermined protocol.

(2-4-6) Interface 98

The interface 98 is used to connect an external instrument to the remote control device controller 90, and is, e.g., a USB, RS-232C, or other type of port. In the present embodiment, the interface 98 is exposed through the lower opening 43 of the casing 40.

(3) Details of Common Functions Assigned to Function Keys 52

The remote control device 30 has, as common functions assigned to the function keys 52, a first common function for entering the selected entry (entering the selection of the set item), a second common function for canceling the selected entry (canceling the selection of the set item), and a third common function for either moving the selection from the selected entry to another entry (moving from the selected set item to another set item) or transitioning the control mode.

In the present embodiment, the third common function is assigned to the F1 key 52*a* due to the F1 input signal and the third common function being associated in the control program. The first common function is assigned to the F2 key 52*b* due to the F2 input signal and the first common function being associated in the control program. The second common function is assigned to the F3 key 52*c* due to the F3 input signal and the second common function being associated in the control program. Specifically, the remote control device 30 is configured so as to implement the third common function when the F1 key 52*a* is pushed, implement the first common function when the F2 key 52*b* is pushed, and implement the second common function when the F3 key 52*c* is pushed.

In the control modes except for the common function assignment mode, the ninth touch signal is defined as the same signal as the F1 input signal, the tenth touch signal is defined as the same signal as the F2 input signal, and the eleventh touch signal is defined as the same signal as the F3 input signal. Consequently, in the control modes except for the common function assignment mode, the F1 key 52*a* is treated as pushed when the ninth touch input part 79 is touched, the F2 key 52*b* is treated as pushed when the tenth touch input part 80 is touched, and the F3 key 52*c* is treated as pushed when the eleventh touch input part 81 is touched. Specifically, in the control modes except for the common function assignment mode, it is considered that the same third common function as the F1 key 52*a* is assigned to the ninth touch input part 79, the same first common function as the F2 key 52*b* is assigned to the tenth touch input part 80, and the same second common function as the F3 key 52*c* is assigned to the eleventh touch input part 81.

(4) Details of Process of Remote Control Device Controller 90

The details of the process of the remote control device controller 90 are described below for each control mode.

(4-1) Process During Standby Mode

During normal times, the remote control device controller 90 executes a process in accordance with standby mode. The term "normal times" used in this embodiment indicates times when no instructions have been inputted to the remote control device 30, e.g., times when operation has stopped or times other than those in which a user has inputted instructions via the remote control device 30 during the state of operation.

Upon acquiring the start/stop switch signal in standby mode, the input controller 93 assesses that the signal is the operation start instruction when operation is stopped, and assesses that the signal is the operation stop instruction during the state of operation.

When the input controller 93 assesses that the signal is the operation start instruction, the input controller acquires information pertaining to the operating state from the second storage part 92, creates the operation start signal including this information, and outputs this signal to the display controller 94 and the communication part 97. When the input controller 93 assesses that the signal is the operation stop instruction, the input controller creates the operation stop signal and outputs this signal to the display controller 94 and the communication part 97.

The communication part 97, upon receiving the operation start signal or the operation stop signal outputted from the input controller 93, transmits the signal to the indoor unit controller 22 according to a predetermined protocol.

The display controller 94, upon receiving the operation start signal outputted from the input controller 93, creates the corresponding display data signal and outputs this signal to the liquid crystal display part 61. Upon receiving the operation stop signal outputted from the input controller 93, the display controller 94 creates the display stop signal and outputs this signal to the liquid crystal display part 61.

Figure 5:
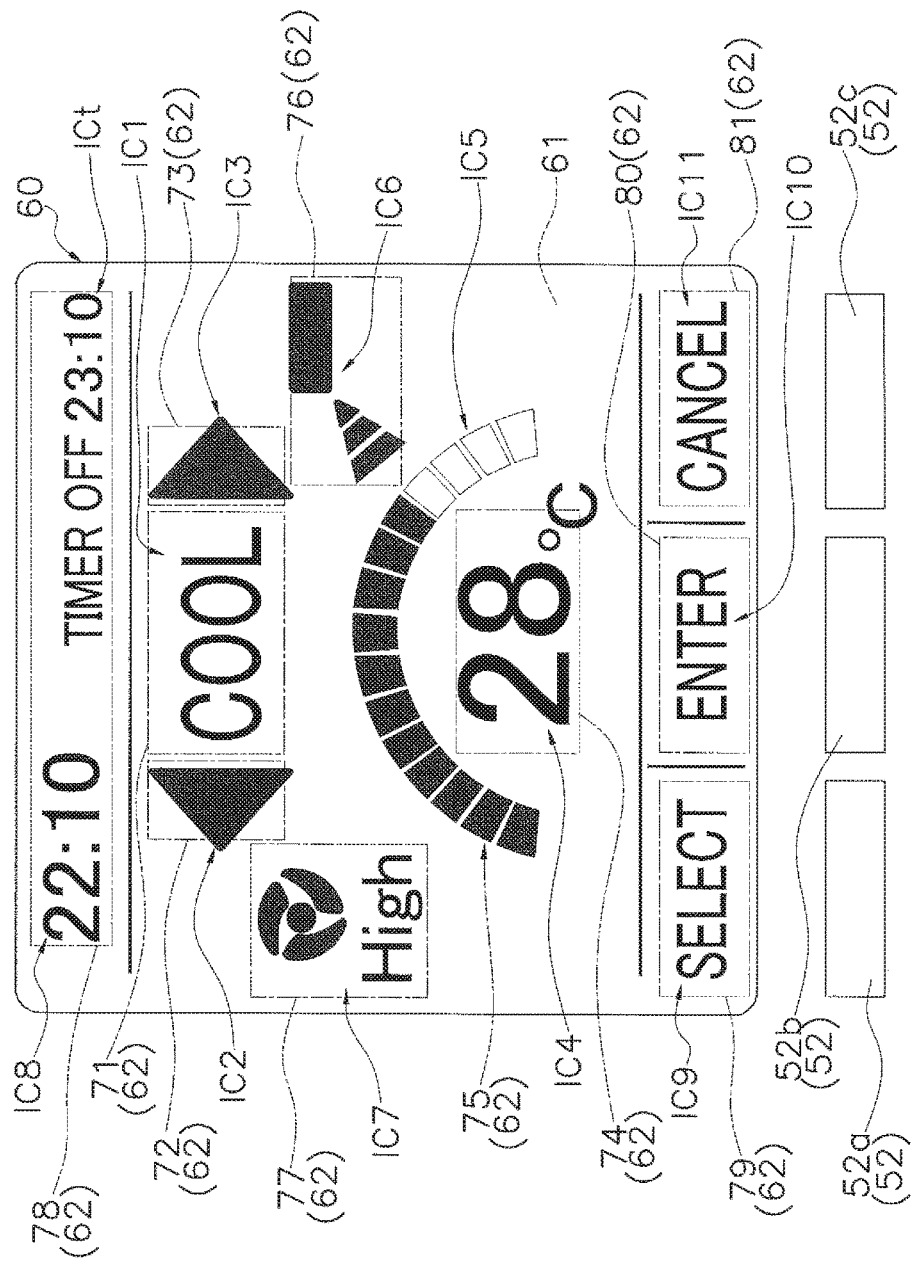
FIG. 5 is a schematic view showing an example of an image displayed on the liquid crystal display part during standby mode.

The image displayed on the liquid crystal display part 61 shall now be described with reference to FIG. 5. FIG. 5 is an example of an image displayed on the liquid crystal display part 61 when the operation start instruction has been inputted during standby mode.

During standby mode, words, graphics, or symbols are displayed so as to be superimposed on the touch input parts. During standby mode, backlight brightness is set to high until a predetermined time elapses after the display is started, and after the predetermined time elapses, the backlight brightness of the liquid crystal display part 61 is set to low for the sake of energy conservation.

Specifically, a word indicating the current operating mode (referred to as "first icon IC1" in the description below for the sake of convenience) is displayed so as to be superimposed over the first touch input part 71. In FIG. 5, the word "COOL" is displayed, indicating that air-cooling mode is in effect.

A triangular icon (referred to as "second icon IC2" in the description below for the sake of convenience) is displayed so as to be superimposed over the second touch input part 72, and another triangular icon (referred to as "third icon IC3" in the description below for the sake of convenience) is displayed so as to be superimposed over the third touch input part 73. The second icon IC2 and the third icon IC3 are displayed in bilateral symmetry with the first icon IC1.

A number indicating the current set temperature (referred to as "fourth icon IC4" in the description below for the sake of convenience) is displayed so as to be superimposed over the fourth touch input part 74. In FIG. 5, "28° C." is displayed, indicating that the set temperature is set to 28 degrees.

Fifteen quadrangular icons (collectively referred to as "fifth icon IC5" in the description below for the sake of convenience) are displayed in the form of an arch so as to be superimposed over the fifth touch input part 75. This fifth icon IC5 is provided in order to display the set temperature during operation in an intuitively recognizable manner, and the quadrangles correspond respectively to the numerical values (integers) of the set temperature. Specifically, the quadrangle farthest to the left (superimposed over the fifth touch input part 75*a*) corresponds to the lowest set temperature of 18 degrees. The first quadrangle from the left (superimposed over the fifth touch input part 75*b*) corresponds to 19 degrees, the second quadrangle from the left (superimposed over the fifth touch input part 75*c*) corresponds to 20 degrees, and in this manner the corresponding set temperature increases by one degree with each quadrangle farther to the right, with the quadrangle farthest to the right (superimposed over the fifth touch input part 75*o*) corresponding to the highest set temperature of 32 degrees.

When the air conditioning system 100 is in the state of operation, the quadrangle corresponding to the set temperature during operation and the quadrangles to the left thereof in the fifth icon IC5 are displayed as being colored in. In FIG. 5, the eleventh quadrangle from the left (superimposed over the fifth touch input part 75*k*) and the quadrangles to the left thereof (superimposed over the fifth touch input parts 75*a* to 75*j*) are displayed as being colored in and only the contours are displayed for the quadrangles to the right of the eleventh (superimposed over the fifth touch input parts 75*l* to 75*o*), in order to display that the set temperature is set to 28 degrees.

Graphics representing the indoor unit 20 and the airflow blown out from the indoor unit 20 (referred to as "sixth icon IC6" in the description below for the sake of convenience) are also displayed so as to be superimposed over the sixth touch input part 76. The sixth icon IC6 indicates the airflow direction during operation. In the sixth icon 106, the graphics (a triangle and trapezoids) representing the airflow blown out from the indoor unit 20 are displayed as moving up and down in accordance with the set airflow direction. FIG. 5 shows a display indicating that the set airflow direction is set to middle.

Graphics and words indicating the current set airflow volume (referred to as "seventh icon IC7" in the description below for the sake of convenience) are displayed so as to be superimposed over the seventh touch input part 77. The graphics in the seventh icon IC7 are in the shape of a propeller fan having three blades, and the number of blades displayed as being colored in changes in accordance with the set airflow volume. More specifically, the seventh icon IC7 has one blade colored in when the set airflow volume is set to low, two blades colored in when the volume is set to medium, and three blades colored in when the volume is set to high. In FIG. 5, three blades are colored in and the words "High" are displayed in the bottom of the icon to indicate that the set airflow volume is high.

Numbers indicating the current time (referred to as "eighth icon IC8" in the description below for the sake of convenience) are displayed so as to be superimposed over the eighth touch input part 78. In FIG. 5, "22:10" is displayed to indicate that the time is 10:10 pm. When the timer is set, the time at which the timer will turn off (this timer off time display is referred to as a timer icon IC*t* in the description below for the sake of convenience) is displayed to the right of the current time so as to be superimposed over the eighth touch input part 78. In FIG. 5, "TIMER OFF 23:10" is displayed to indicate that the time at which the tinier will turn off is one hour later at 11:10 pm.

Words indicating the common function (the third common function) assigned to the F1 key 52a and the ninth touch input part 79 (referred to as "ninth icon IC9" in the description below for the sake of convenience) are displayed so as to be superimposed over the ninth touch input part 79 (i.e., directly above the F1 key 52a). In FIG. 5, the word "SELECT" is displayed to indicate that the third common function has been assigned to the F1 key 52a.

Words indicating the common function (the first common function) assigned to the F2 key 52b and the tenth touch input part 80 (referred to as "tenth icon IC10" in the description below for the sake of convenience) are displayed so as to be superimposed over the tenth touch input part 80 (i.e., directly above the F2 key 52b). In FIG. 5, the word "ENTER" is displayed to indicate that the first common function has been assigned to the F2 key 52b.

Words indicating the common function (the second common function) assigned to the F3 key 52c and the eleventh touch input part 81 (referred to as "eleventh icon IC11" in the description below for the sake of convenience) are displayed so as to be superimposed over the eleventh touch input part 81 (i.e., directly above the F3 key 52c). In FIG. 5, the word "CANCEL" is displayed to indicate that the second common function has been assigned to the F3 key 52c.

When the input controller 93 acquires any of the first through eighth touch signals and the fifth touch signals (a) to (o) during standby mode, the input controller transitions from standby mode to a predetermined mode and performs a process thereof.

For example, when the input controller 93 acquires the first touch signal, the second touch signal, or the third touch signal (when the first touch input part 71, the second touch input part 72, or the third touch input part 73 superimposed respectively over the first icon IC1, the second icon IC2, or the third icon IC3 is touched) during standby mode, the input controller transitions to operation switch mode.

When the input controller 93 acquires any of the fourth touch signal and the fifth touch signals (a) to (o) (when the fourth touch input part 74 or the fifth touch input part 75 superimposed over the fourth icon IC4 or the fifth icon IC5 is touched) during standby mode, the input controller transitions to set temperature switch mode.

During standby mode, the input controller 93 transitions to airflow direction switch mode upon acquiring the sixth touch signal (when the sixth touch input part 76 superimposed over the sixth icon IC6 is touched), transitions to airflow volume switch mode upon acquiring the seventh touch signal (when the seventh touch input part 77 superimposed over the seventh icon IC7 is touched), and transitions to timer setting mode upon acquiring the eighth touch signal (when the eighth touch input part 78 superimposed over the eighth icon IC8 is touched).

As described above, the third common function (a function for moving from the selected entry to another selection or for transitioning the control mode) is assigned as the common function to the ninth touch input part and the F1 key 52a. With this function, the input controller 93 transitions to set item selection mode upon acquiring the ninth touch signal or the F1 input signal (when either the ninth touch input part 79 superimposed over the ninth icon IC9 is touched or the F1 key 52a is pushed) during standby mode.

When the external storage device 110 or another external instrument is connected via a cable C3 and the interface 98 during standby mode (see FIG. 4), the common function setting part 96 recognizes the connection and transitions to common function assignment mode.

The input controller 93 or the common function setting part 96 outputs a signal corresponding to the transitioned mode to the display controller 94. The display controller 94 receives this signal, creates the display data signal corresponding to the control modes, and outputs this data display signal to the liquid crystal display part 61.

(4-2) Process During Operation Switch Mode

Upon receiving a signal indicating a transition to operation switch mode from the input controller 93, the display controller 94 creates the predetermined display data signal and outputs this signal to the liquid crystal display part 61. Having received this signal, the liquid crystal display part 61 sets the backlight brightness to high and causes the first icon IC1 to blink for a predetermined period. The second through eighth icons IC2 to IC8 and the tinier icon ICt do not display anything. This state is referred to as the first state of operation switch mode in the description below.

Figure 6:
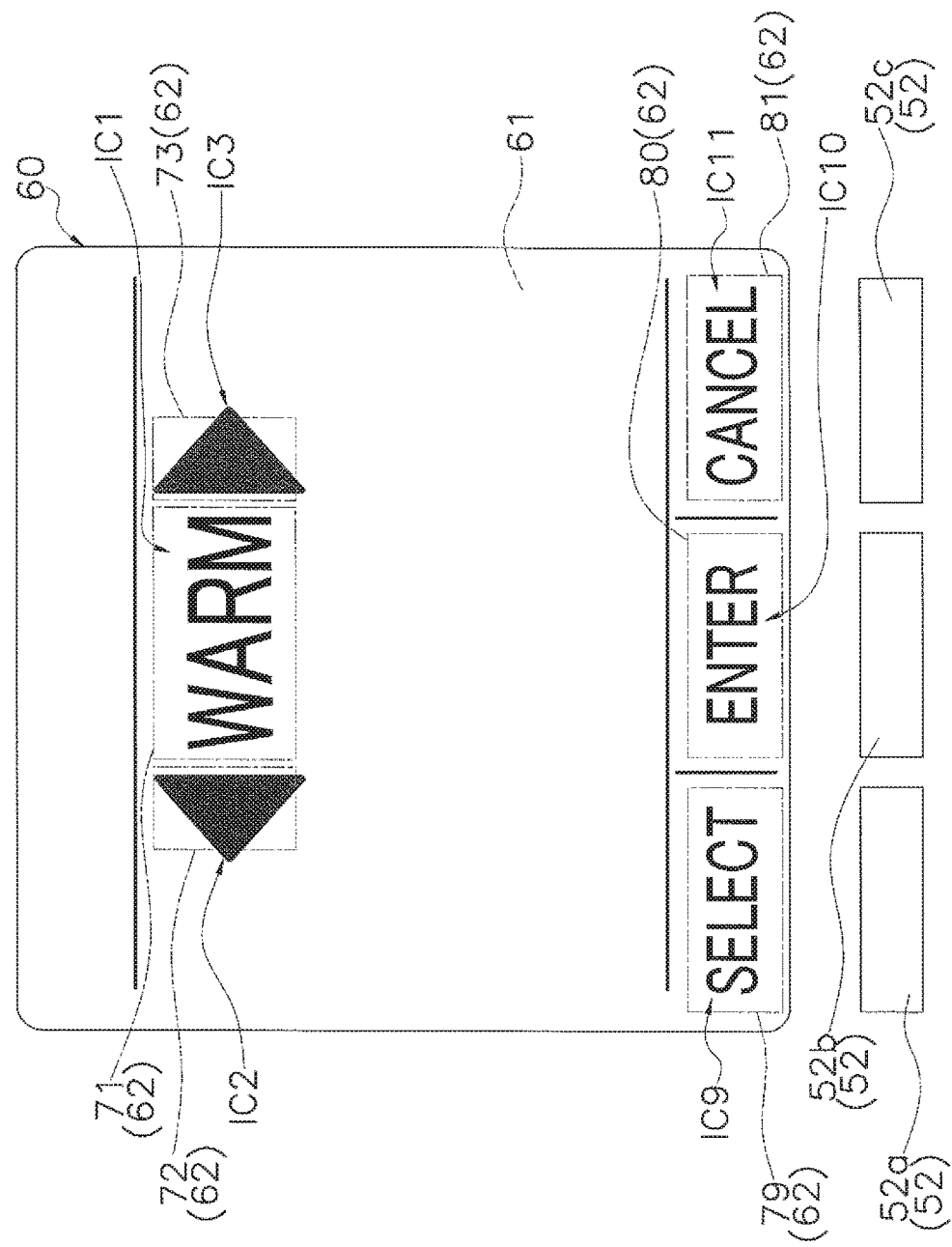
FIG. 6 is a schematic view showing an example of an image displayed on the liquid crystal display part during operation switch mode.

When the first icon IC1 is blinking with the word "COOL" during the first state of operation switch mode and the input controller 93 acquires the second touch signal (the second touch input part 72 superimposed over the second icon IC2 is touched), the ninth touch signal (the ninth touch input part 79 superimposed over the ninth icon IC9 is touched), or the F1 input signal (the F1 key 52a is pushed), the input controller assesses that the selected operating mode has changed to air-warming and outputs a signal indicating this fact to the display controller 94. The display controller 94 receives this signal, creates the predetermined display data signal, and outputs this display data signal to the liquid crystal display part 61. The liquid crystal display part 61 receives this display data signal and changes the blinking first icon IC1 from "COOL" to "WARM" (see FIG. 6). In the description below, this state is referred to as a second state of operation switch mode.

Figure 7:
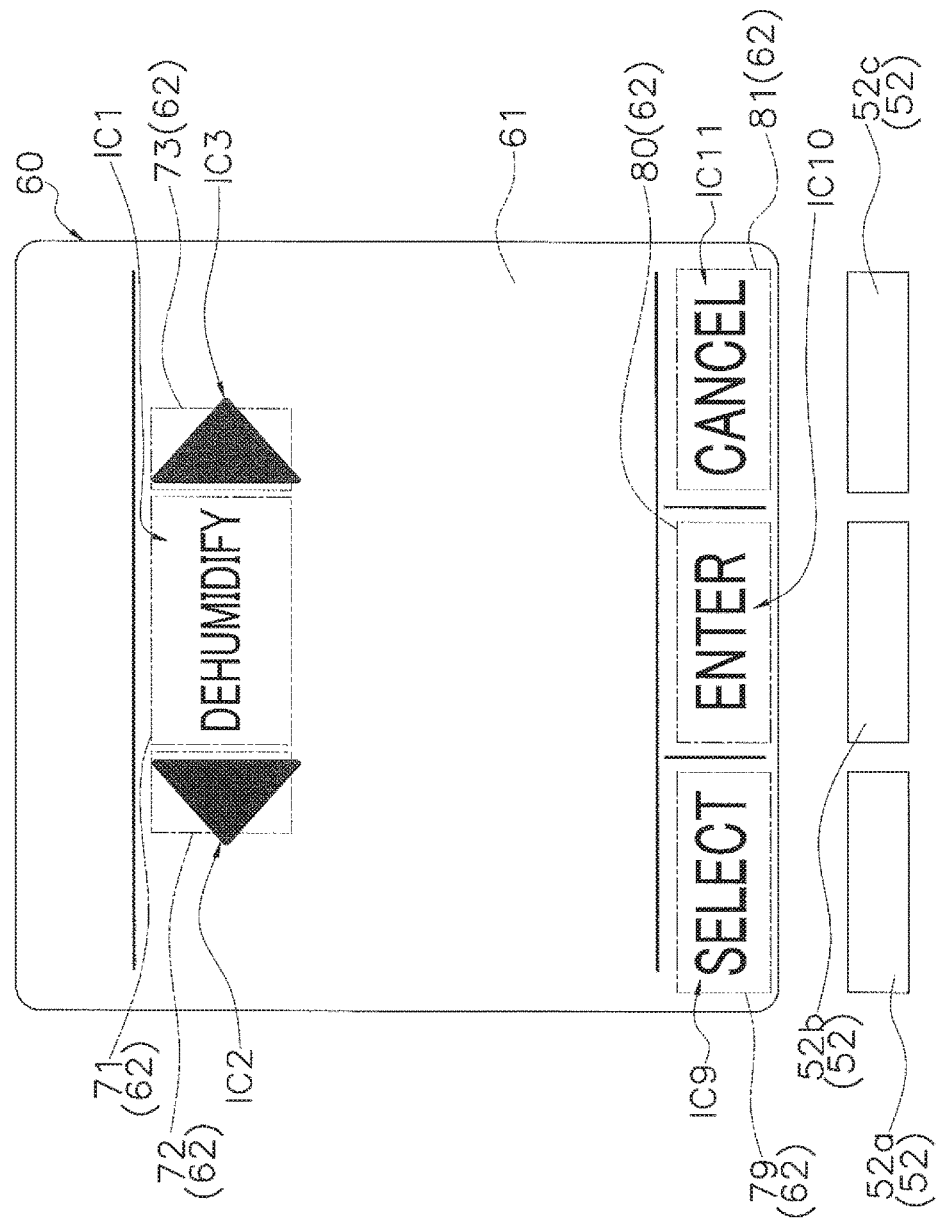
FIG. 7 is a schematic view showing an example of an image displayed on the liquid crystal display part during operation switch mode.

When the input controller 93 acquires the third touch signal (the third touch input part 73 superimposed over the third icon IC3 is touched) during the first state of operation switch mode (when the word "COOL" as the first icon IC1 is blinking); or when the input controller acquires the second touch signal (the second touch input part 72 superimposed over the second icon IC2 is touched), acquires the ninth touch signal (the ninth touch input part 79 superimposed over the ninth icon IC9 is touched), or acquires the F1 input signal (the F1 key 52a is pushed) during the second state (when the word "WARM" as the first icon IC1 is blinking), the input controller assesses that the set operating mode has been changed from either air-cooling or air-warming to dehumidifying, and outputs a signal indicating this fact to the display controller 94. The display controller 94 receives this signal, creates the predetermined display data signal, and outputs this display data signal to the liquid crystal display part 61. The liquid crystal display part 61 receives this display data signal and changes the blinking first icon IC1 from either "COOL" or "WARM" to "DEHUMIDIFY" (see FIG. 7). This state is referred to as a third state of operation switch mode in the description below.

During the first state, second state, or third state of operation switch mode, when the input controller 93 acquires the first touch signal (the first touch input part 71 superimposed over the first icon IC1 is touched), acquires the tenth touch signal (the tenth touch input part 80 superimposed over the tenth icon IC10 is touched), or acquires the F2 input signal (the F2 key 52b is pushed), the input controller assesses that the selected operating mode has been entered and outputs a signal indicating this fact to the display controller 94. The input controller 93 then creates the operation switch signal instructing that a switch be made to the entered operating mode, and outputs this signal to the communication part 97.

The display controller 94 receives the signal indicating the operating mode has been entered from the input controller 93, and outputs the predetermined display data signal to the liquid crystal display part 61. Having received this signal, the liquid crystal display part 61 changes the display of the first icon IC1 from blinking to solid, displays the second through eighth icons IC2 to IC8 (as well as the timer icon ICt when the timer has been set), and switches the backlight brightness from high to low after the predetermined time has elapsed.

The communication part 97 transmits the operation switch signal outputted from the input controller 93 to the indoor unit controller 22 according to a predetermined protocol.

When the input controller 93 acquires the eleventh touch signal or the F3 input signal in the first state of operation switch mode, the input controller transitions to standby mode and outputs a signal indicating this fact to the display controller 94.

When the input controller 93 acquires the eleventh touch signal or the F3 input signal in the second state or third state of operation switch mode, the input controller transitions to the first state of operation switch mode and outputs a signal indicating this fact to the display controller 94.

(4-3) Process During Set Temperature Switch Mode

Upon receiving a signal indicating a transition to set temperature switch mode from the input controller 93, the display controller 94 creates the predetermined display data signal and outputs this display data signal to the liquid crystal display part 61. Having received this signal, the liquid crystal display part 61 sets the backlight brightness to high and causes the fourth icon IC4 to blink for a predetermined period. The first through third icons IC1 to IC3, the sixth through eighth icons IC6 to IC8, and the timer icon ICt do not display anything. In the description below, this state is referred to as a first state of set temperature switch mode.

In the first state of set temperature switch mode, when the input controller 93 acquires the fifth touch signal ((a) to (o)) (the fifth touch input part 75 superimposed over the fifth icon IC5 is touched), acquires the ninth touch signal (the ninth touch input part 79 superimposed over the ninth icon IC9 is touched), or the F1 input signal (the F1 key 52a is pushed), the input controller assesses that the selected set temperature has been changed and outputs a signal indicating this fact to the display controller 94. The display controller 94 receives this signal, creates the predetermined display data signal, and outputs this display data signal to the liquid crystal display part 61. The liquid crystal display part 61 receives this display data signal and changes the number on the blinking fourth icon IC4 and the colored quadrangles in the fifth icon IC5 as appropriate. In the description below, this state is referred to as a second state of set temperature switch mode.

Figure 8:
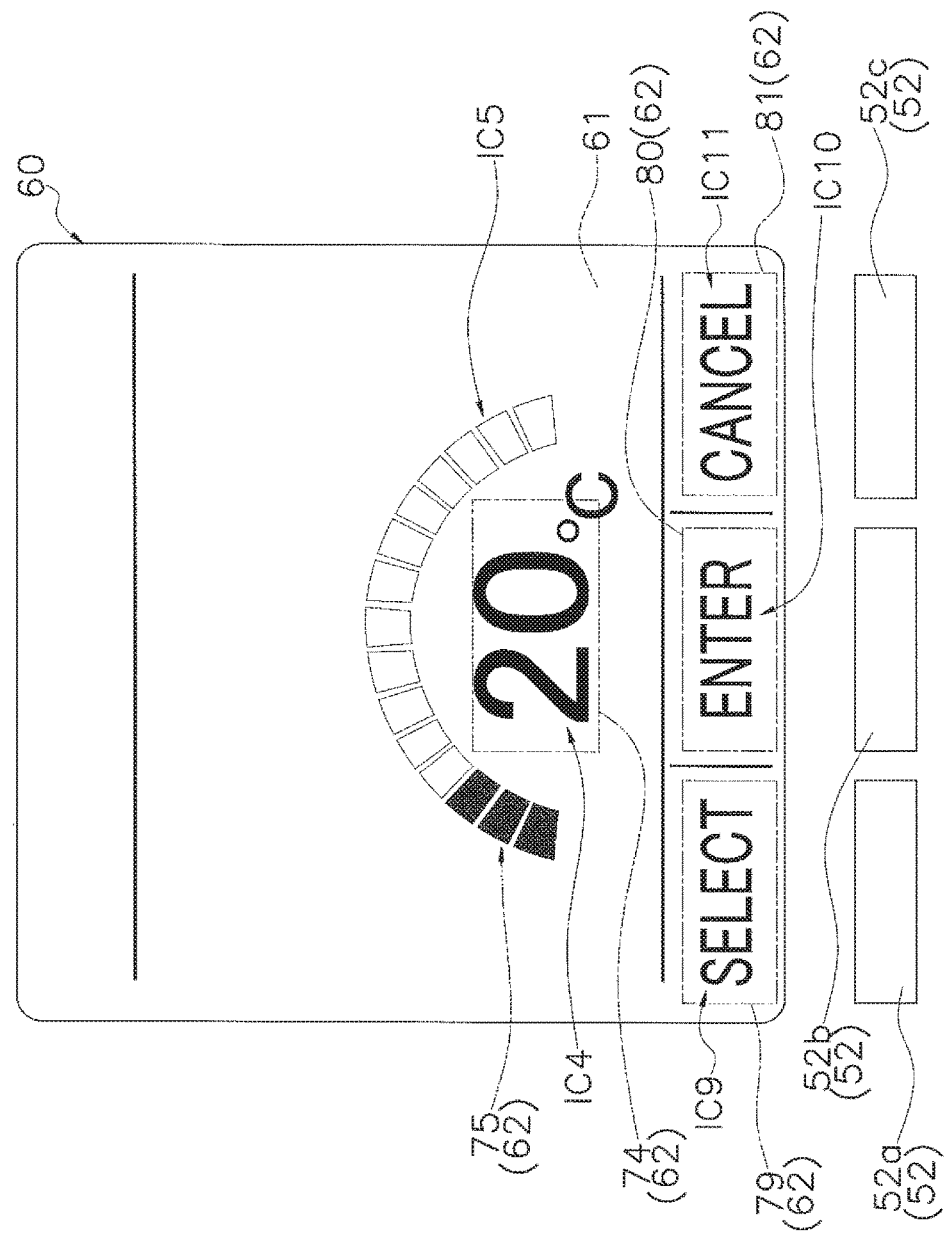
FIG. 8 is a schematic view showing an example of an image displayed on the liquid crystal display part during set temperature switch mode.

For example, in the first state of set temperature switch mode (the set temperature being 28 degrees), when the fifth touch input part 75c is touched, the ninth touch input part 79 is touched seven times, or the F1 key 52a is pushed seven times, the liquid crystal display part 61 changes the blinking fourth icon IC4 from "28° C." to "20° C." and colors in three quadrangles from the left in the fifth icon IC5 (the quadrangle superimposed over the fifth touch input parts 75a to 75c), as shown in FIG. 8.

Figure 9:
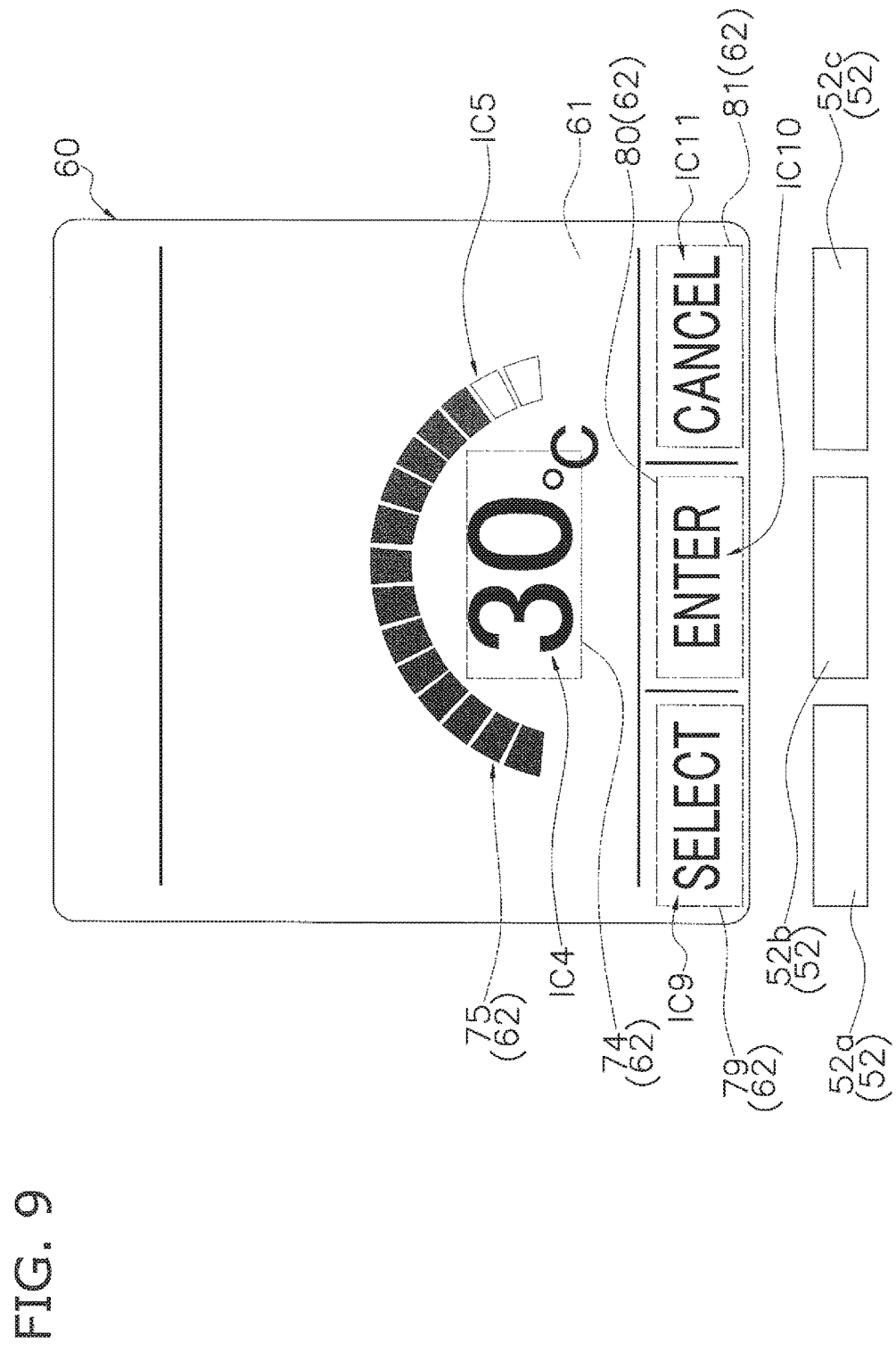
FIG. 9 is a schematic view showing an example of an image displayed on the liquid crystal display part during set temperature switch mode.

For example, in the first state of set temperature switch mode (the set temperature being 28 degrees), when the fifth touch input part 75m is touched, the ninth touch input part 79 is touched twice, or the F1 key 52a is pushed twice, the liquid crystal display part 61 changes the blinking fourth icon IC4 from "28° C." to "30° C." and colors in thirteen quadrangles from the left in the fifth icon IC5 (the quadrangle superimposed over the fifth touch input parts 75a to 75m), as shown in FIG. 9.

In the first state or second state of set temperature switch mode, when the input controller 93 acquires the fourth touch signal (the fourth touch input part 74 superimposed over the fourth icon IC4 is touched), acquires the tenth touch signal (the tenth touch input part 80 superimposed over the tenth icon IC10 is touched), or acquires the F2 input signal (the F2 key 52b is pushed), the input controller assesses that the selected set temperature has been entered, and outputs a signal indicating this fact to the display controller 94. The input controller 93 then creates the set temperature switch signal instructing that a switch be made to the entered set temperature, and outputs this signal to the communication part 97.

Having received from the input controller 93 a signal indicating that the set temperature has been entered, the display controller 94 outputs the predetermined display data signal to the liquid crystal display part 61. Having received this signal, the liquid crystal display part 61 changes the display of the fourth icon IC4 from blinking to solid, displays the first through third icons IC1 to IC3 and the sixth through eighth icons IC6 to IC8 (as well as the timer icon ICt when the timer has been set), and switches the backlight brightness from high to low after the predetermined time has elapsed.

The communication part 97 transmits the set temperature switch signal outputted from the input controller 93 to the indoor unit controller 22 according to a predetermined protocol.

When the input controller 93 acquires the eleventh touch signal or the F3 input signal in the first state of set temperature switch mode, the input controller transitions to standby mode and outputs a signal indicating this fact to the display controller 94.

When the input controller 93 acquires the eleventh touch signal or the F3 input signal in the second state of set temperature switch mode, the input controller transitions to the first state of set temperature switch mode and outputs a signal indicating this fact to the display controller 94.

(4-4) Process During Airflow Direction Switch Mode

When the display controller 94 receives a signal indicating a transition to airflow direction switch mode from the input controller 93, the display controller creates the predetermined display data signal and outputs this signal to the liquid crystal display part 61. Having received this signal, the liquid crystal display part 61 sets the backlight brightness to high and causes the sixth icon IC6 to blink for a predetermined period. The first through fifth icons IC1 to IC5, the seventh icon IC7, the eighth icon IC8, and the timer icon ICt do not display anything. This state is referred to as a first state of airflow direction switch mode in the description below.

In the first state of airflow direction switch mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selected airflow direction has been changed by one level and outputs a signal indicating this fact to the display controller 94. The display controller 94 receives this signal, creates the predetermined display data signal, and outputs the display data signal to the liquid crystal display part 61. The liquid crystal display part 61 receives this display data signal and changes the blinking sixth icon IC6. This state is referred to as a second state of the airflow direction switch mode in the description below.

Figure 10:
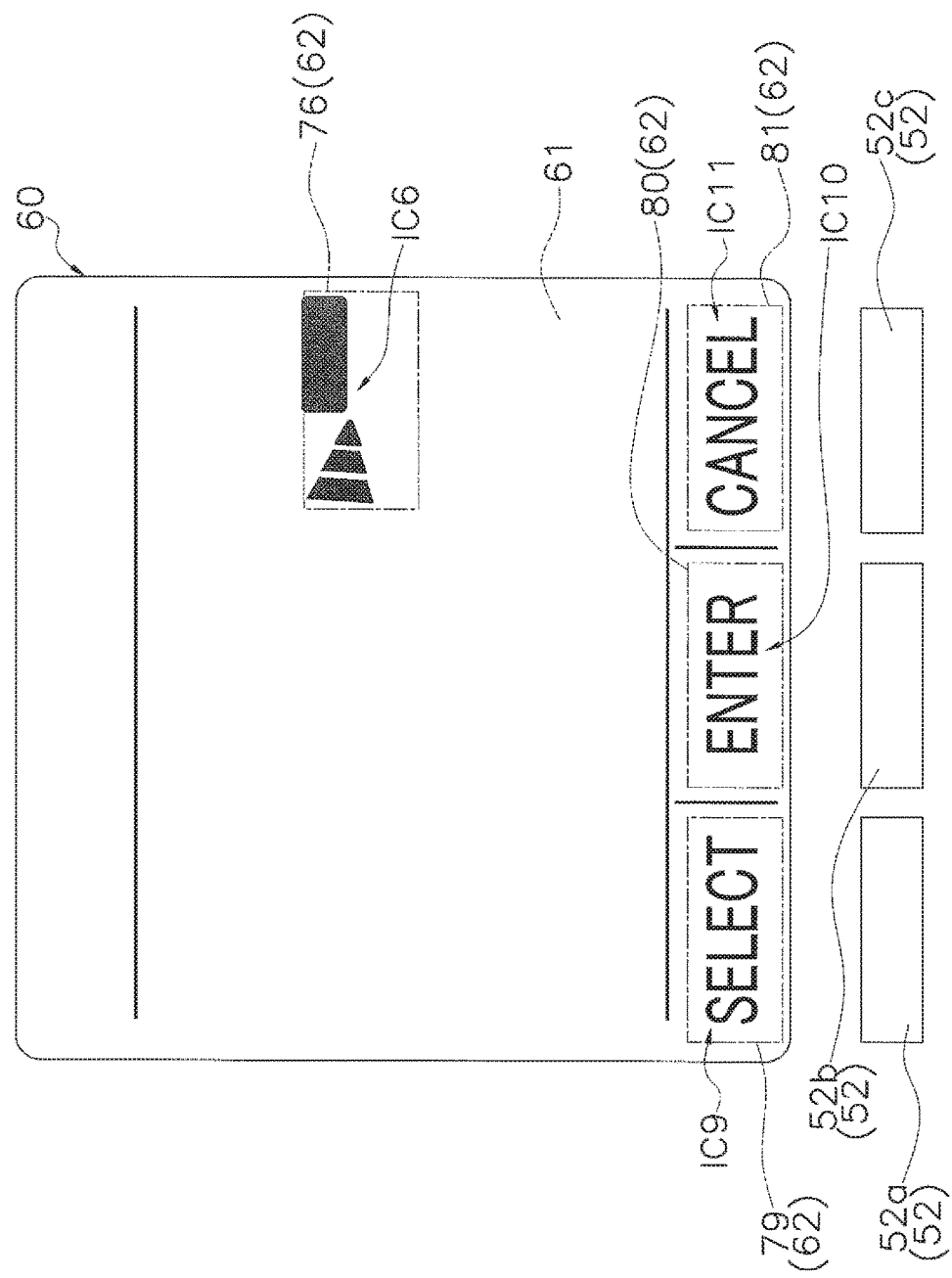
FIG. 10 is a schematic view showing an example of an image displayed on the liquid crystal display part during airflow direction switch mode.

For example, when the ninth touch input part 79 or the F1 key 52*a* is pushed while the selected airflow direction is middle in the first state of airflow direction switch mode, the blinking sixth icon IC6 is changed to a display indicating that the selected airflow direction is up (see FIG. 10). When the ninth touch input part 79 or the F1 key 52*a* is pushed while the selected airflow direction is up in the first state of airflow direction switch mode, the blinking sixth icon IC6 is changed to a display indicating that the selected airflow direction is down (see FIG. 11).

In the second state of airflow direction switch mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selected airflow direction has been changed by one more level and outputs a signal indicating this fact to the display controller 94. The display controller 94 receives this signal, creates the predetermined display data signal, and outputs the display data signal to the liquid crystal display part 61. The liquid crystal display part 61 receives this display data signal and changes the blinking sixth icon IC6. This state is referred to as a third state of the airflow direction switch mode in the description below.

Figure 11:
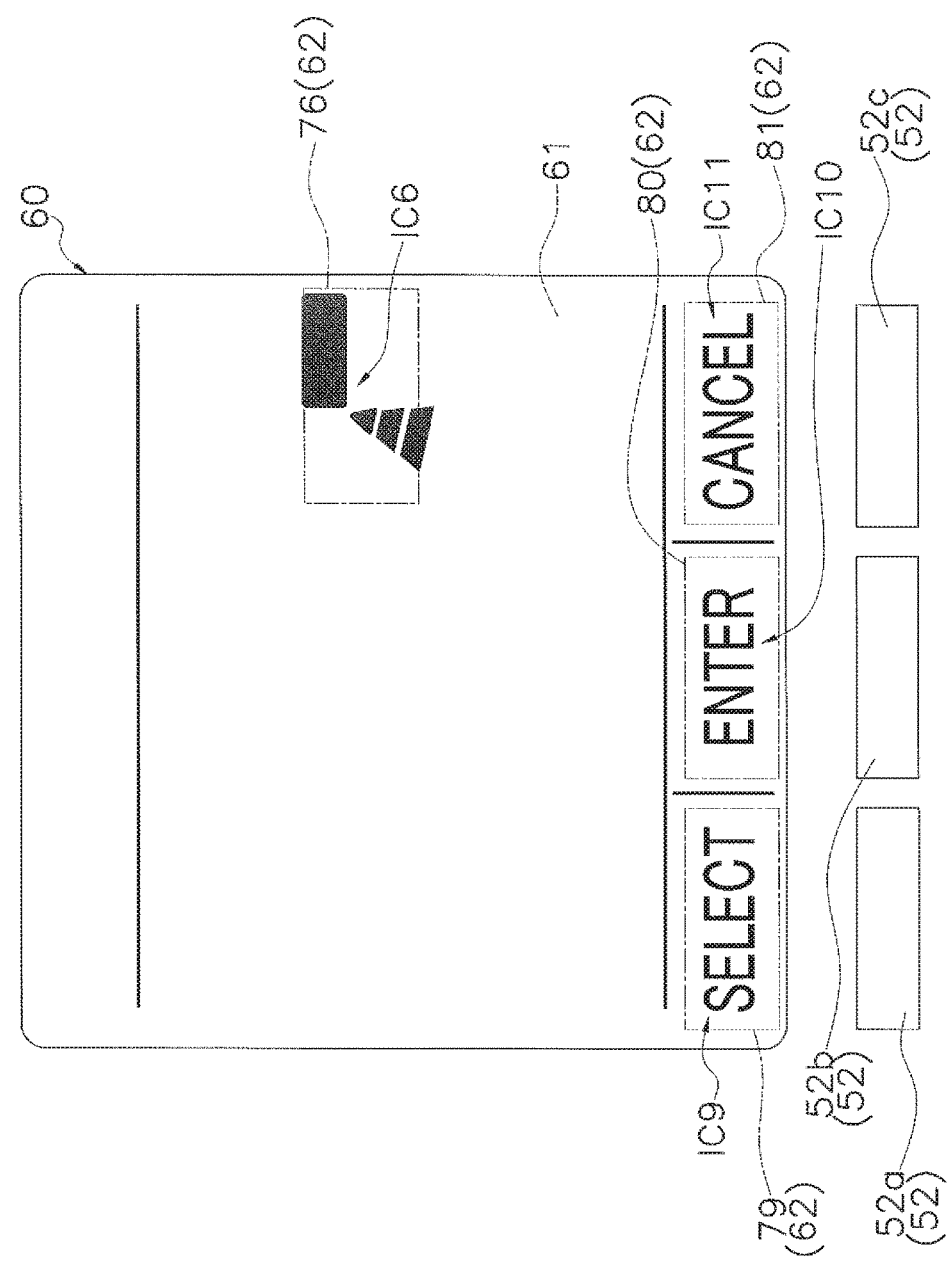
FIG. 11 is a schematic view showing an example of an image displayed on the liquid crystal display part during airflow direction switch mode.

For example, when the ninth touch input part 79 or the F1 key 52*a* is pushed while the selected airflow direction is up in the second state of airflow direction switch mode, the blinking sixth icon IC6 is changed to a display indicating that the selected airflow direction is down (see FIG. 11). When the ninth touch input part 79 or the F1 key 52*a* is pushed while the selected airflow direction is middle in the second state of airflow direction switch mode, the blinking sixth icon IC6 is changed to a display indicating that the selected airflow direction is up (see FIG. 10).

In the first state, second state, or third state of the airflow direction switch mode, when the input controller 93 acquires the sixth touch signal (the sixth touch input part 76 superimposed over the sixth icon IC6 is touched), acquires the tenth touch signal (the tenth touch input part 80 superimposed over the tenth icon IC10 is touched), or acquires the F2 input signal (the F2 key 52*b* is pushed), the input controller assesses that the selected airflow direction has been entered and outputs a signal indicating this fact to the display controller 94. The input controller 93 then creates the airflow direction switch signal instructing that a switch be made to the entered airflow direction, and outputs this signal to the communication part 97.

The display controller 94 receives the signal indicating an airflow direction has been entered from the input controller 93, and outputs the predetermined display data signal to the liquid crystal display part 61. Having received this signal, the liquid crystal display part 61 changes the display of the sixth icon IC6 from blinking to solid, displays the first through fifth icons IC1 to IC5, the seventh icon IC7, and the eighth icon IC8 (as well as the timer icon ICt when the timer has been set), and switches the backlight brightness from high to low after the predetermined time has elapsed.

The communication part 97 transmits the airflow direction switch signal outputted from the input controller 93 to the indoor unit controller 22 according to a predetermined protocol.

When the input controller 93 acquires the eleventh touch signal or the F3 input signal in the first state of airflow direction switch mode, the input controller transitions to standby mode and outputs a signal indicating this fact to the display controller 94.

When the input controller 93 acquires the eleventh touch signal or the F3 input signal in the second state or third state of airflow direction switch mode, the input controller transitions to the first state of airflow direction switch mode and outputs a signal indicating this fact to the display controller 94.

(4-5) Process During Airflow Volume Switch Mode

When the display controller 94 receives a signal indicating the transition to airflow volume switch mode from the input controller 93, the display controller creates the predetermined display data signal and outputs this signal to the liquid crystal display part 61. Having received this signal, the liquid crystal display part 61 sets the backlight brightness to high and causes the seventh icon IC7 to blink for a predetermined period. The first through sixth icons IC1 to IC6, the eighth icon IC8, and the timer icon ICt do not display anything. This state is referred to as a first state of airflow volume switch mode in the description below.

In the first state of airflow volume switch mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selected set airflow volume has been changed by one level and outputs a signal indicating this fact to the display controller 94. The display controller 94 receives this signal, creates the predetermined display data signal, and outputs the display data signal to the liquid crystal display part 61. The liquid crystal display part 61 receives this display data signal and changes the blinking seventh icon IC7. This state is referred to as a second state of the airflow volume switch mode in the description below.

Figure 12:
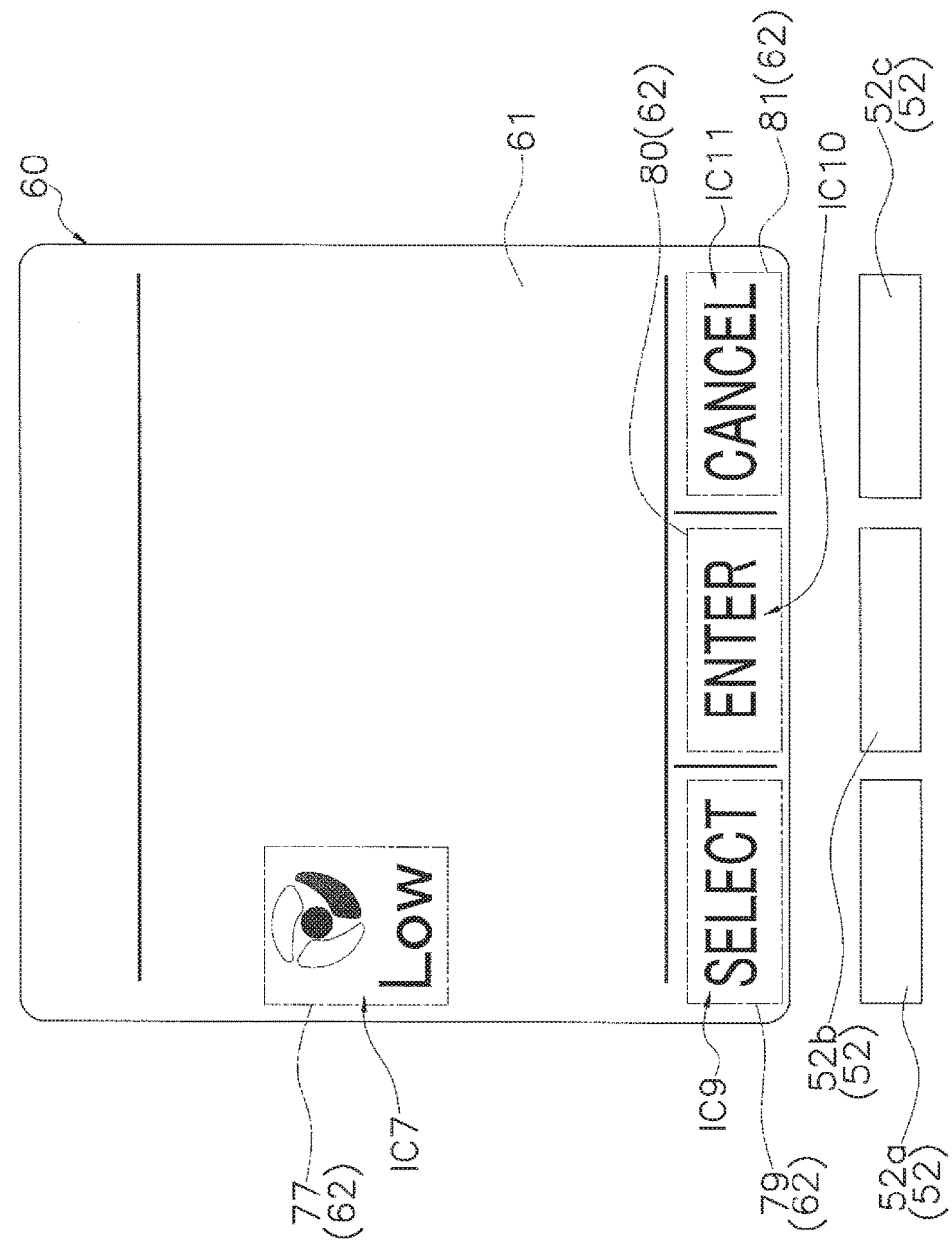
FIG. 12 is a schematic view showing an example of an image displayed on the liquid crystal display part during airflow volume switch mode.

For example, when the ninth touch input part 79 or the F1 key 52*a* is pushed while the selected set airflow volume is high in the first state of airflow volume switch mode, the blinking seventh icon IC7 is changed to a display indicating that the selected airflow volume is low (see FIG. 12). When the ninth touch input part 79 or the F1 key 52*a* is pushed while the selected set airflow volume is low in the first state of airflow volume switch mode, the blinking seventh icon IC7 is changed to a display indicating that the selected airflow volume is medium (see FIG. 13).

In the second state of airflow volume switch mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selected set airflow volume has been changed by one level and outputs a signal indicating this fact to the display controller 94. The display controller 94 receives this signal, creates the predetermined display data signal, and outputs the display data signal to the liquid crystal display part 61. The liquid crystal display part 61 receives this display data signal and changes the blinking seventh icon IC7. This state is referred to as a third state of the airflow volume switch mode in the description below.

Figure 13:
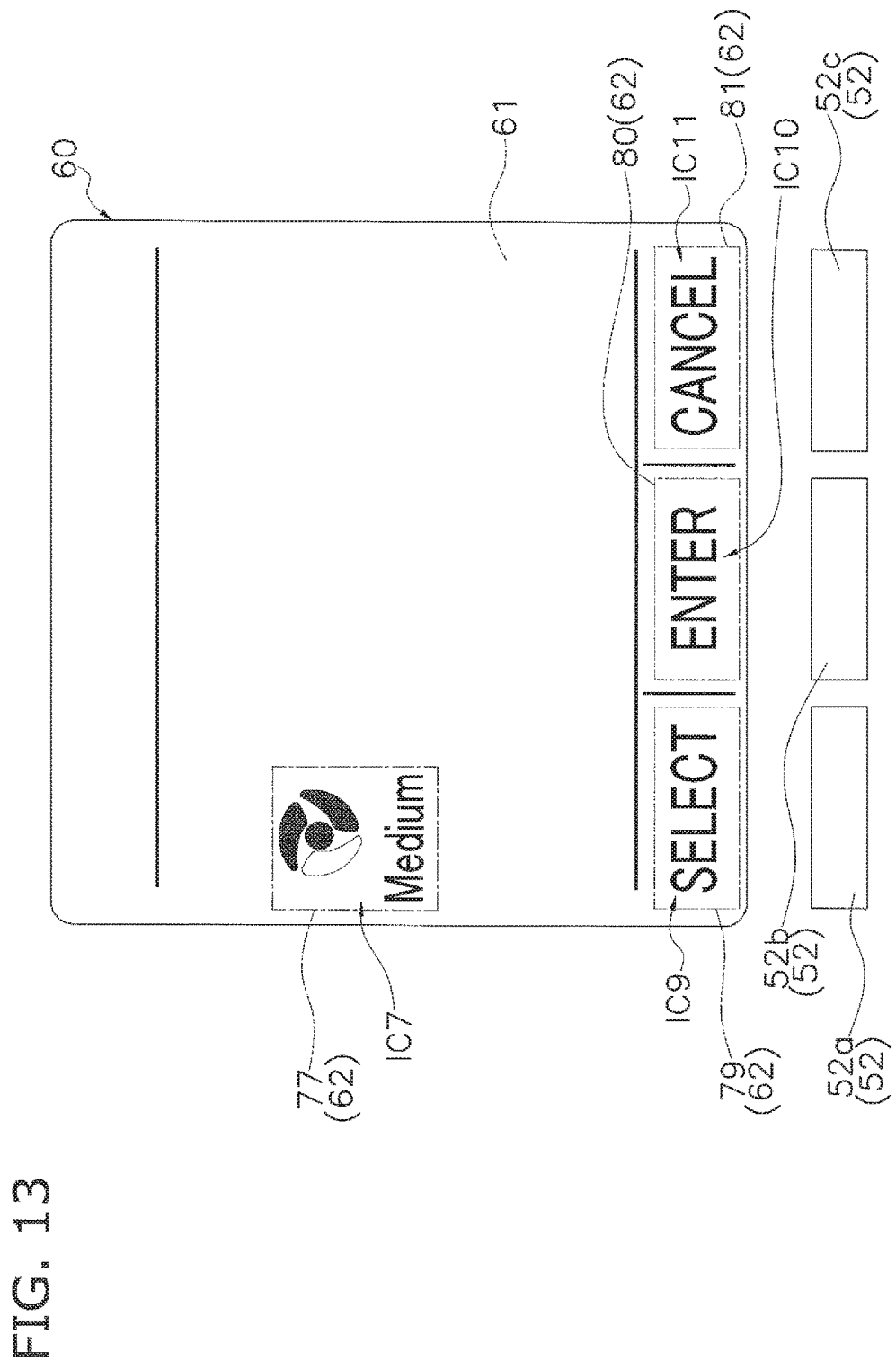
FIG. 13 is a schematic view showing an example of an image displayed on the liquid crystal display part during airflow volume switch mode.

For example, when the ninth touch input part 79 or the F1 key 52*a* is pushed while the selected set airflow volume is low in the second state of airflow volume switch mode, the blinking seventh icon IC7 is changed to a display indicating that the selected airflow volume is medium (see FIG. 13). When the ninth touch input part 79 or the F1 key 52a is pushed while the selected set airflow volume is high in the second state of airflow volume switch mode, the blinking seventh icon IC7 is changed to a display indicating that the selected airflow volume is low (see FIG. 12).

In the first state, second state, or third state of the airflow volume switch mode, when the input controller 93 acquires the seventh touch signal (the seventh touch input part 77 superimposed over the seventh icon IC7 is touched), acquires the tenth touch signal (the tenth touch input part 80 superimposed over the tenth icon IC10 is touched), or acquires the F2 input signal (the F2 key 52b is pushed), the input controller assesses that the selected airflow volume has been entered and outputs a signal indicating this fact to the display controller 94. The input controller 93 then creates the airflow volume switch signal instructing that a switch be made to the entered airflow volume, and outputs this signal to the communication part 97.

The display controller 94 receives the signal indicating an airflow volume has been entered from the input controller 93, and outputs the predetermined display data signal to the liquid crystal display part 61. Having received this signal, the liquid crystal display part 61 changes the display of the seventh icon IC7 from blinking to solid, displays the first through sixth icons IC1 to IC6 and the eighth icon IC8 (as well as the timer icon ICt when the timer has been set), and switches the backlight brightness from high to low after the predetermined time has elapsed.

The communication part 97 transmits the airflow volume switch signal outputted from the input controller 93 to the indoor unit controller 22 according to a predetermined protocol.

When the input controller 93 acquires the eleventh touch signal or the F3 input signal in the first state of airflow volume switch mode, the input controller transitions to standby mode and outputs a signal indicating this fact to the display controller 94.

When the input controller 93 acquires the eleventh touch signal or the F3 input signal in the second state or third state of airflow volume switch mode, the input controller transitions to the first state of airflow volume switch mode and outputs a signal indicating this fact to the display controller 94.

(4-6) Process During Timer Setting Mode

When the display controller 94 receives a signal indicating the transition to timer setting mode from the input controller 93, the display controller creates the predetermined display data signal and outputs this signal to the liquid crystal display part 61. Having received this signal, the liquid crystal display part 61 sets the backlight brightness to high and causes the timer icon ICt to blink for a predetermined period. The first through seventh icons IC1 to IC7 do not display anything. This state is referred to as a first state of timer setting mode in the description below.

In the first state of timer setting mode, when the input controller 93 acquires the ninth touch signal (the ninth touch input part 79 superimposed over the ninth icon IC9 is touched) or acquires the F1 input signal (the F1 key 52a is pushed), the input controller assesses that the selected set time for the timer to turn off has been changed by one level and outputs a signal indicating this fact to the display controller 94. The display controller 94 receives this signal, creates the predetermined display data signal, and outputs the display data signal to the liquid crystal display part 61.

The liquid crystal display part 61 receives this display data signal and changes the blinking timer icon ICt. This state is referred to as a second state of the timer setting mode in the description below.

In the present embodiment, the set time at which the timer will turn off uses thirty minutes as one level. Therefore, every time the ninth touch input part 79 or the F1 key 52a is pushed once in the first state of timer setting mode, the time increases by thirty minutes in the blinking timer icon ICt.

Figure 14:
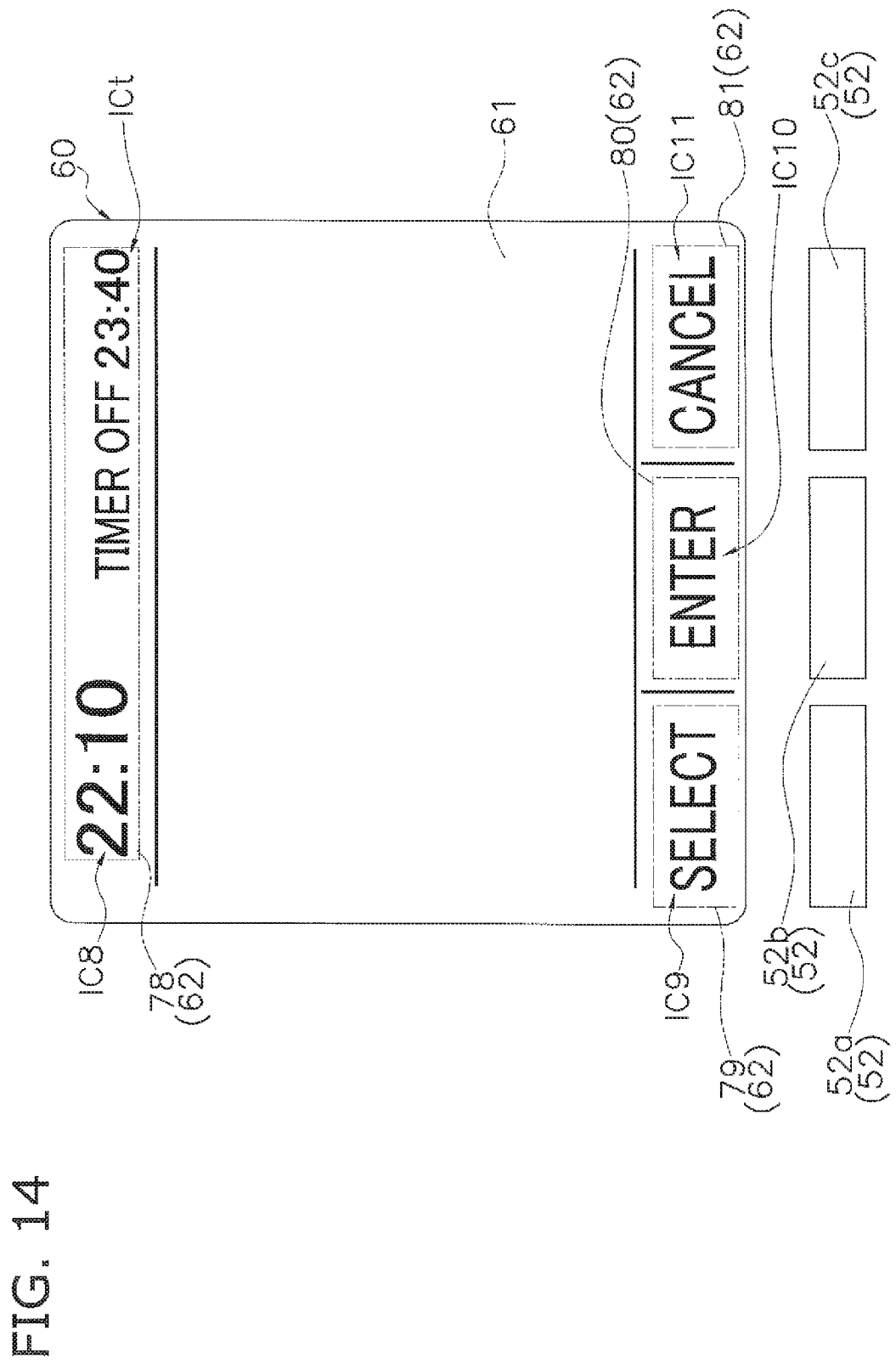
FIG. 14 is a schematic view showing an example of an image displayed on the liquid crystal display part during timer setting mode.
Figure 15:
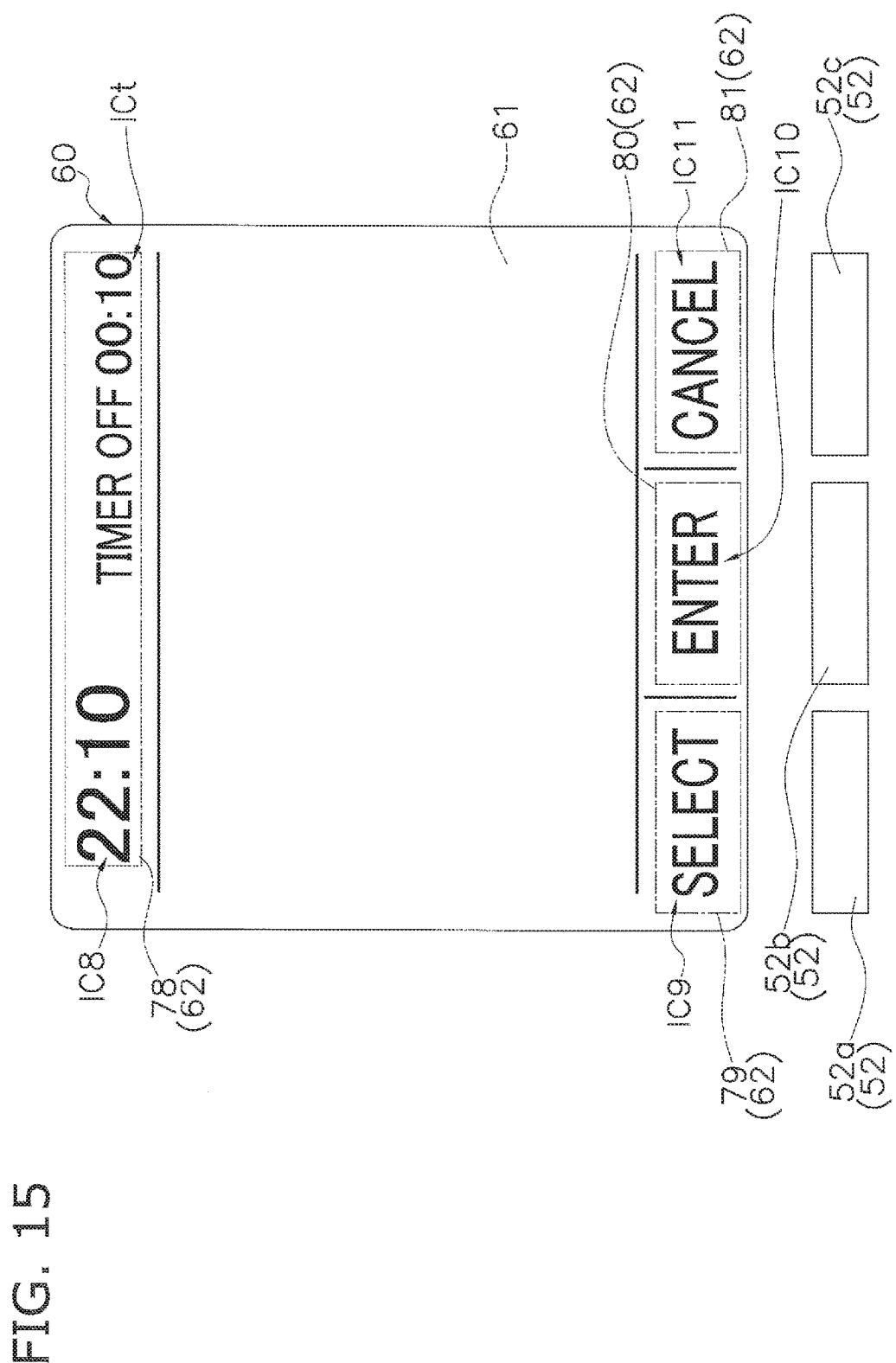
FIG. 15 is a schematic view showing an example of an image displayed on the liquid crystal display part during timer setting mode.

For example, when the ninth touch input part 79 or the F1 key 52a is pushed once while the blinking timer icon ICt reads "23:10" in the first state of timer setting mode, the timer icon ICt is changed to "23:40" (see FIG. 14). When the ninth touch input part 79 or the F1 key 52a is pushed twice, the blinking timer icon ICt is changed to "00:10" (see FIG. 15).

In the first state or second state of timer setting mode, when the input controller 93 acquires the eighth touch signal (the eighth touch input part 78 superimposed over the timer icon ICt is touched), acquires the tenth touch signal (the tenth touch input part 80 superimposed over the tenth icon IC10 is touched), or acquires the F2 input signal (the F2 key 52b is pushed), the input controller assesses that the selected timer off set time has been entered, and outputs a signal indicating this fact to the display controller 94. The input controller 93 then creates the timer off signal instructing that the timer be turned off at the entered set time, and outputs this signal to the timer controller 95.

The display controller 94 receives from the input controller 93 the signal indicating that the timer off set time has been entered, and outputs the predetermined display data signal to the liquid crystal display part 61. Having received this signal, the liquid crystal display part 61 changes the timer icon IC1 from blinking to solid, displays the first through seventh icons IC1 to IC7, and switches the backlight brightness from high to low after the predetermined time has elapsed.

The timer controller 95 receives the timer off signal outputted from the input controller 93, and when the set time designated in the timer off signal arrives, the timer controller creates the operation stop signal and outputs this signal to the display controller 94 and the communication part 97.

Upon receiving the operation stop signal outputted from the timer controller 95, the communication part 97 transmits this signal to the indoor unit controller 22 according to a predetermined protocol.

Upon receiving the operation stop signal from the timer controller 95, the display controller 94 creates the display stop signal and outputs this signal to the liquid crystal display part 61.

When the input controller 93 acquires the eleventh touch signal or the F3 input signal in the first state of timer setting mode, the input controller transitions to standby mode and outputs a signal indicating this fact to the display controller 94.

When the input controller 93 acquires the eleventh touch signal or the F3 input signal in the second state of timer setting mode, the input controller transitions to the first state of timer setting mode and outputs a signal indicating this fact to the display controller 94.

(4-7) Process During Set Item Selection Mode

When the display controller 94 receives a signal indicating the transition to set item selection mode from the input controller 93, the display controller creates the predetermined display data signal and outputs this signal to the liquid crystal display part 61. Having received this signal, the liquid crystal display part 61 sets the backlight brightness to high and causes the first icon IC1 to blink for a predetermined period. This state is referred to as a first state of set item selection mode in the description below.

In the first state of set item selection mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selection has moved from the selected set item to another set item, and outputs a signal indicating this fact to the display controller 94. The display controller 94 receives this signal, creates the predetermined display data signal, and outputs the display data signal to the liquid crystal display part 61. The liquid crystal display part 61 receives the display data signal, switches the blinking first icon IC1 to solid, and causes the fourth icon IC4 to blink. This state is referred to as a second state of set item selection mode in the description below.

In the second state of set item selection mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selection has moved from the selected set item to another set item, and outputs a signal indicating this fact to the display controller 94. The display controller 94 receives this signal, creates the predetermined display data signal, and outputs the display data signal to the liquid crystal display part 61. The liquid crystal display part 61 receives the display data signal, switches the blinking fourth icon IC4 to solid, and causes the sixth icon IC6 to blink. This state is referred to as a third state of set item selection mode in the description below.

In the third state of set item selection mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selection has moved from the selected set item to another set item, and outputs a signal indicating this fact to the display controller 94. The display controller 94 receives this signal, creates the predetermined display data signal, and outputs the display data signal to the liquid crystal display part 61. The liquid crystal display part 61 receives the display data signal, switches the blinking sixth icon IC6 to solid, and causes the seventh icon IC7 to blink. This state is referred to as a fourth state of set item selection mode in the description below.

In the fourth state of set item selection mode, when the input controller 93 acquires the ninth touch signal (the ninth touch input part 79 superimposed over the ninth icon IC9 is touched) or acquires the F1 input signal (the F1 key 52*a* is pushed), the input controller assesses that the selection has moved from the selected set item to another set item, and outputs a signal indicating this fact to the display controller 94. The display controller 94 receives this signal, creates the predetermined display data signal, and outputs the display data signal to the liquid crystal display part 61. The liquid crystal display part 61 receives the display data signal, switches the blinking seventh icon IC7 to solid, and causes the timer icon ICt to blink. This state is referred to as a fifth state of set item selection mode in the description below.

In the fifth state of set item selection mode, when the input controller 93 acquires the ninth touch signal (the ninth touch input part 79 superimposed over the ninth icon IC9 is touched) or acquires the F1 input signal (the F1 key 52*a* is pushed), the input controller transitions to the first state of set item selection mode.

When the input controller 93 acquires a predetermined signal in any of the first through fifth states of set item selection mode, the input controller transitions to the predetermined mode and performs the process thereof.

Specifically, in the first state of set item selection mode, when the input controller 93 acquires the first touch signal (the first touch input part 71 superimposed over the first icon IC1 is touched), acquires the tenth touch signal (the tenth touch input part 80 superimposed over the tenth icon IC10 is touched), or acquires the F2 input signal (the F2 key 52*b* is pushed), the input controller transitions to operation switch mode and outputs a signal indicating this fact to the display controller 94.

In the second state of set item selection mode, when the input controller 93 acquires the fourth touch signal (the fourth touch input part 74 superimposed over the fourth icon IC4 is touched), acquires the tenth touch signal (the tenth touch input part 80 superimposed over the tenth icon IC10 is touched), or acquires the F2 input signal (the F2 key 52*b* is pushed), the input controller transitions to set temperature switch mode and outputs a signal indicating this fact to the display controller 94.

In the third state of set item selection mode, when the input controller 93 acquires the sixth touch signal (the sixth touch input part 76 superimposed over the sixth icon IC6 is touched), acquires the tenth touch signal (the tenth touch input part 80 superimposed over the tenth icon IC10 is touched), or acquires the F2 input signal (the F2 key 52*b* is pushed), the input controller transitions to airflow direction switch mode and outputs a signal indicating this fact to the display controller 94.

In the fourth state of set item selection mode, when the input controller 93 acquires the seventh touch signal (the seventh touch input part 77 superimposed over the seventh icon IC7 is touched), acquires the tenth touch signal (the tenth touch input part 80 superimposed over the tenth icon IC10 is touched), or acquires the F2 input signal (the F2 key 52*b* is pushed), the input controller transitions to airflow volume switch mode and outputs a signal indicating this fact to the display controller 94.

In the fifth state of set item selection mode, when the input controller 93 acquires the eighth touch signal (the eighth touch input part 78 superimposed over the timer icon ICt is touched), acquires the tenth touch signal (the tenth touch input part 80 superimposed over the tenth icon IC10 is touched), or acquires the F2 input signal (the F2 key 52*b* is pushed), the input controller transitions to timer setting mode and outputs a signal indicating this fact to the display controller 94.

When the input controller 93 acquires the eleventh touch signal or the F3 input signal in any of the first through fifth states of set item selection mode, the input controller transitions to standby mode and outputs a signal indicating this fact to the display controller 94.

(4-8) Process During Common Function Assignment Mode

When the display controller 94 receives a signal indicating a transition to common function assignment mode from the common function setting part 96, the display controller creates the predetermined display data signal and outputs this signal to the liquid crystal display part 61.

Figure 16:
FIG. 16 is a schematic view showing an example of an image displayed on the liquid crystal display part during common function assignment mode.

Having received this signal, the liquid crystal display part 61 sets the backlight brightness to high, and displays the words "Select function key to be set" see (FIG. 16) in order to prompt the user to select a function key 52 (52*a*, 52*b*, or 52*c*) to which a common function will be assigned. With no icons displaying anything, the liquid crystal display part 61 at this time causes the symbol "F1" to blink so as to be superimposed over the ninth touch input part 79, causes the symbol "F2" to blink superimposed over the tenth touch input part 80, and causes the symbol "F3" to blink superimposed over the eleventh touch input part 81. This state is referred to as a first state of common function assignment mode in the description below.

When the common function setting part 96 acquires the ninth touch signal (the ninth touch input part 79 is touched) or acquires the F1 input signal (the F1 key 52*a* is pushed) in the first state of common function assignment mode, the common function setting part assesses that the F1 key 52*a* has been selected as the function key 52 to which a common function will be assigned. When the common function setting part 96 acquires the tenth touch signal (the tenth touch input part 80 is touched) or acquires the F2 input signal (the F2 key 52*b* is pushed) in the first state of common function assignment mode, the common function setting part assesses that the F2 key 52*b* has been selected as the function key 52 to which a common function will be assigned. When the common function setting part 96 acquires the eleventh touch signal (the eleventh touch input part 81 is touched) or the F3 input signal (the F3 key 52*c* is pushed) in the first state of common function assignment mode, the common function setting part assess that the F3 key 52*c* has been selected as the function key 52 to which a common function will be assigned.

After making this assessment, the common function setting part 96 acquires a common function stored in the external storage device 110 and outputs the function to the display controller 94.

Figure 17:
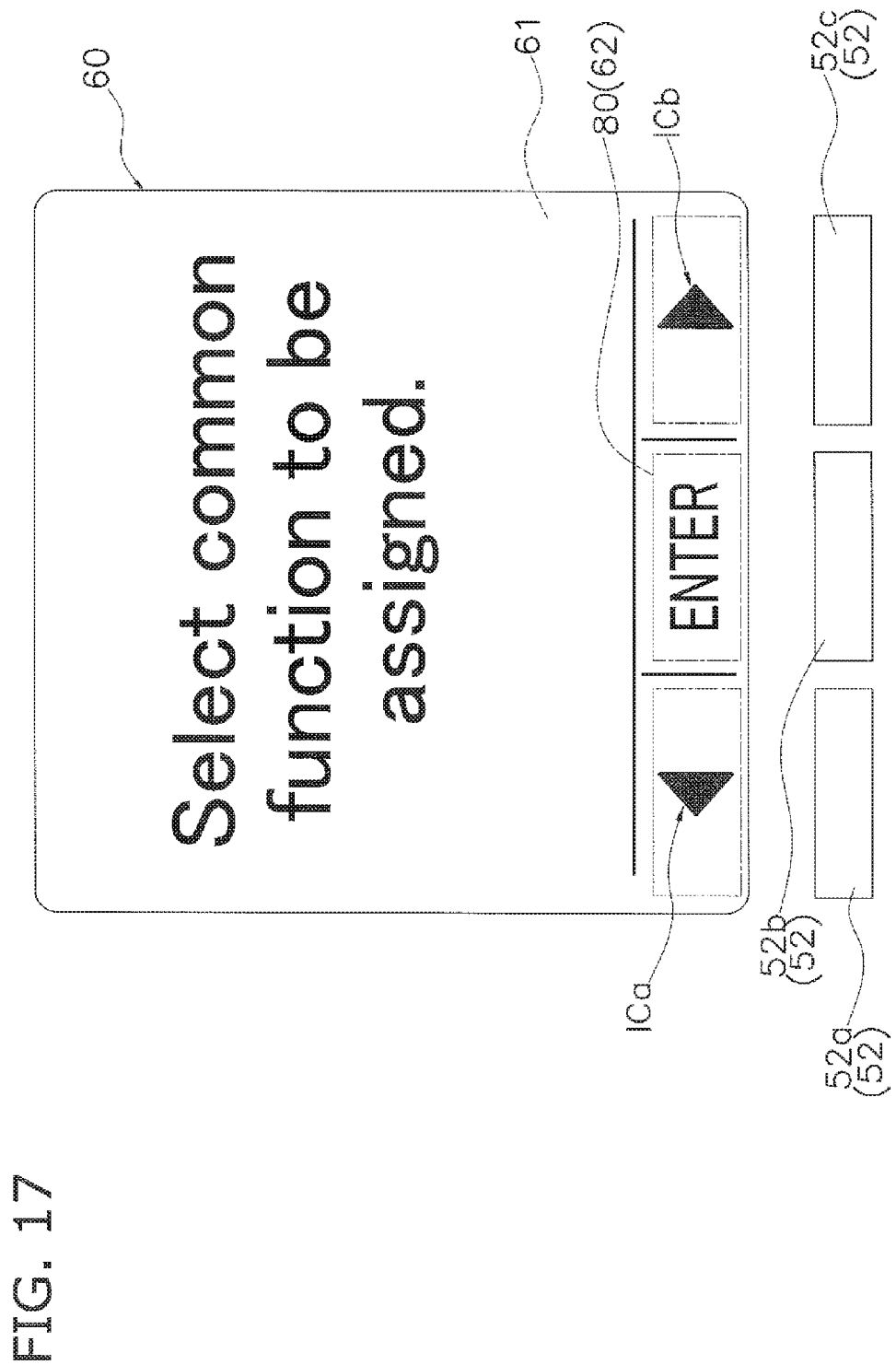
FIG. 17 is a schematic view showing an example of an image displayed on the liquid crystal display part during common function assignment mode.

The display controller 94 receives the common function outputted from the common function setting part 96, creates the predetermined display data signal, and outputs this signal to the liquid crystal display part 61. The liquid crystal display part 61 receives this display data signal, displays the words "Select common function to be assigned" in order to prompt the user to select the common function to be assigned, and displays the common function as blinking so as to be superimposed over the tenth touch input part 80, as shown in FIG. 17 (in FIG. 17, the word "ENTER" blinks to indicate that the first common function is the common function). In addition to this, a triangular icon (referred to as "first selection icon ICa" in the description below) is displayed so as to be superimposed over the ninth touch input part 79, and another triangular icon (referred to as "second selection icon ICb" in the description below) in bilateral symmetry with the first is displayed so as to be superimposed over the eleventh touch input part 81. This state is referred to as a second state of common function assignment mode in the description below.

Figure 18:
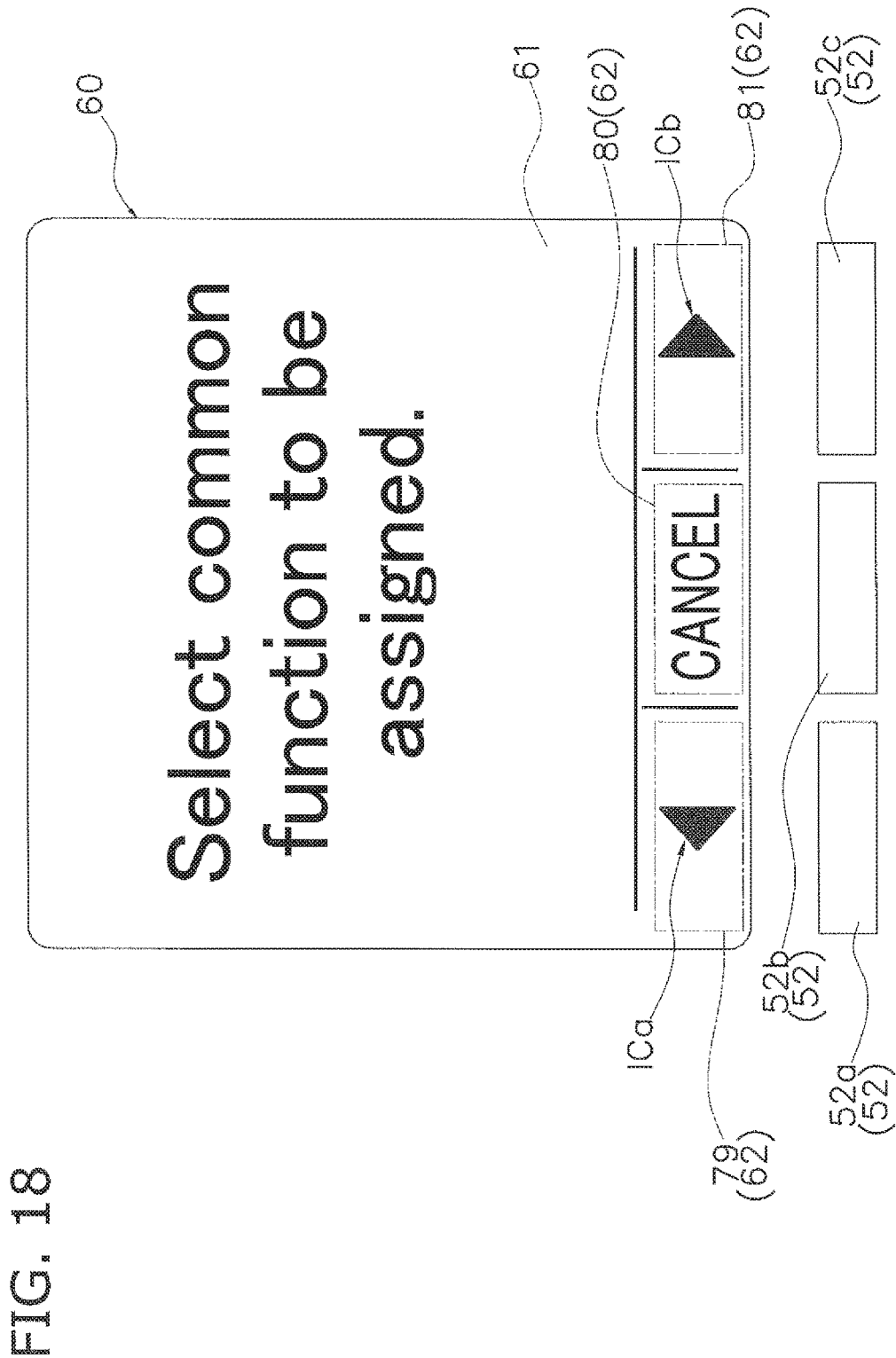
FIG. 18 is a schematic view showing an example of an image displayed on the liquid crystal display part during common function assignment mode.

In the second state of common function assignment mode, when the common function setting part 96 acquires the eleventh touch signal (the eleventh touch input part 81 superimposed over the second selection icon ICb is touched) or the F3 input signal (the F3 key 52*c* is pushed), the common function setting part acquires another common function stored in the external storage device 110 and outputs this function to the display controller 94. The display controller 94 receives the common function outputted from the common function setting part 96, creates the predetermined display data signal, and outputs this signal to the liquid crystal display part 61. The liquid crystal display part 61 receives this display data signal and displays the other common function as blinking so as to be superimposed over the tenth touch input part 80, as shown in FIG. 18 (in FIG. 18, the word "CANCEL" is displayed as blinking to indicate that the second common function is the common function). This state is referred to as a third state of common function assignment mode in the description below.

Figure 19:
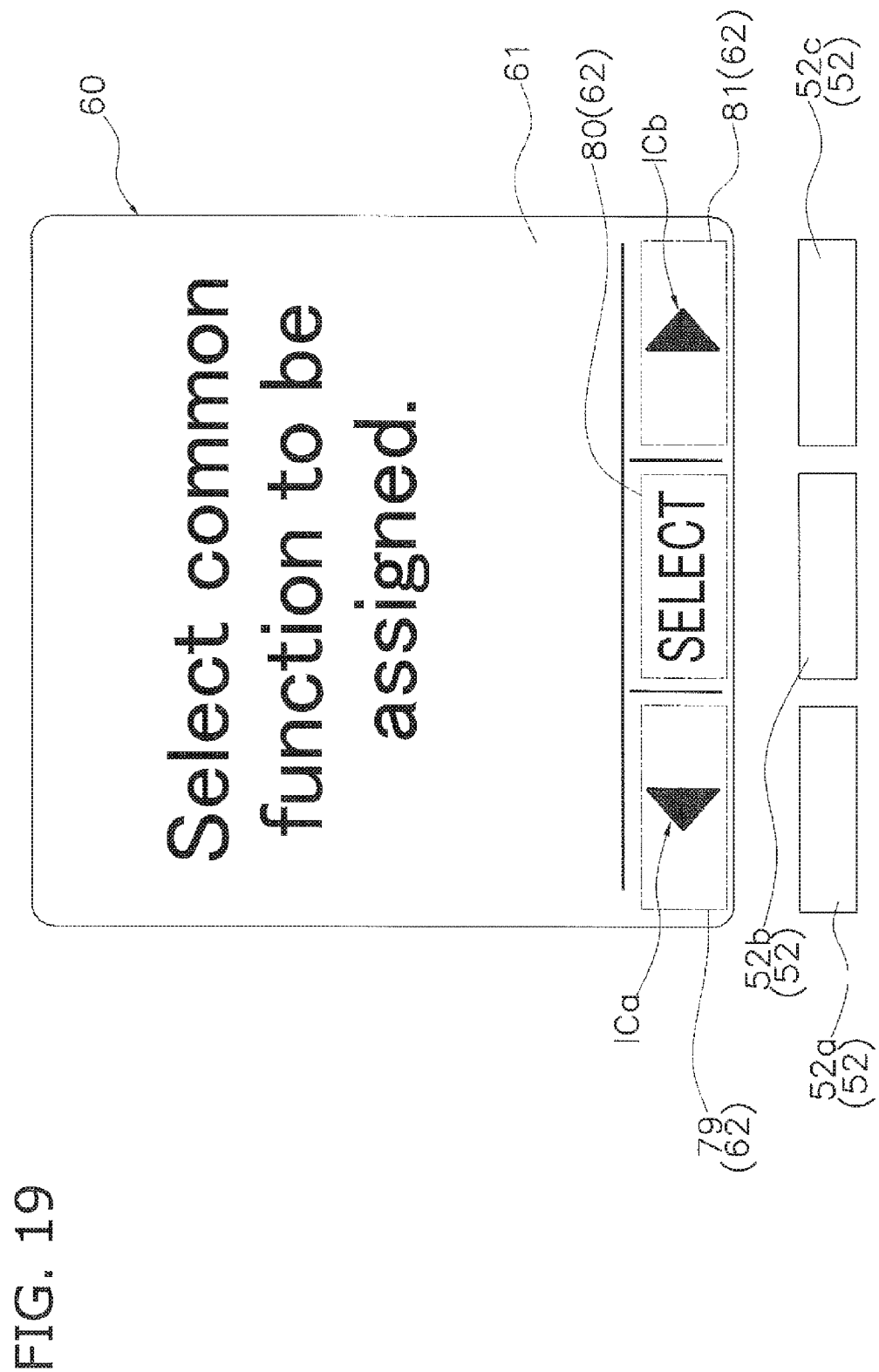
FIG. 19 is a schematic view showing an example of an image displayed on the liquid crystal display part during common function assignment mode.

When the common function setting part 96 either acquires the ninth touch signal (the ninth touch input part 79 superimposed over the first selection icon ICa is touched) or acquires the F1 input signal (the F1 key 52*a* is pushed) in the second state of common function assignment mode, or acquires the eleventh touch signal (the eleventh touch input part 81 superimposed over the second selection icon ICb is touched) or the F3 input signal (the F3 key 52*c* is pushed) in the third state of common function assignment mode, the common function setting part acquires another common function stored in the external storage device 110 and outputs this function to the display controller 94. The display controller 94 receives the common function outputted from the common function setting part 96, creates the predetermined display data signal, and outputs this signal to the liquid crystal display part 61. The liquid crystal display part 61 receives this display data signal, and displays the other common function as blinking so as to be superimposed over the tenth touch input part 80 as shown in FIG. 19 (in FIG. 19, the word "SELECT" is displayed as blinking to indicate that the third common function is the common function). This state is referred to as a fourth state of common function assignment mode in the description below.

When the common function setting part 96 acquires the tenth touch signal (the tenth touch input part 80 is touched) or acquires the F2 input signal (the F2 key 52*b* is pushed) in the second state, third state, or fourth state of common function assignment mode, the common function setting part assesses that the common function assigned to the function key 52 has been entered, outputs a signal indicating this fact to the display controller 94, and rewrites the control programs stored in the first storage part 91.

Figure 20:
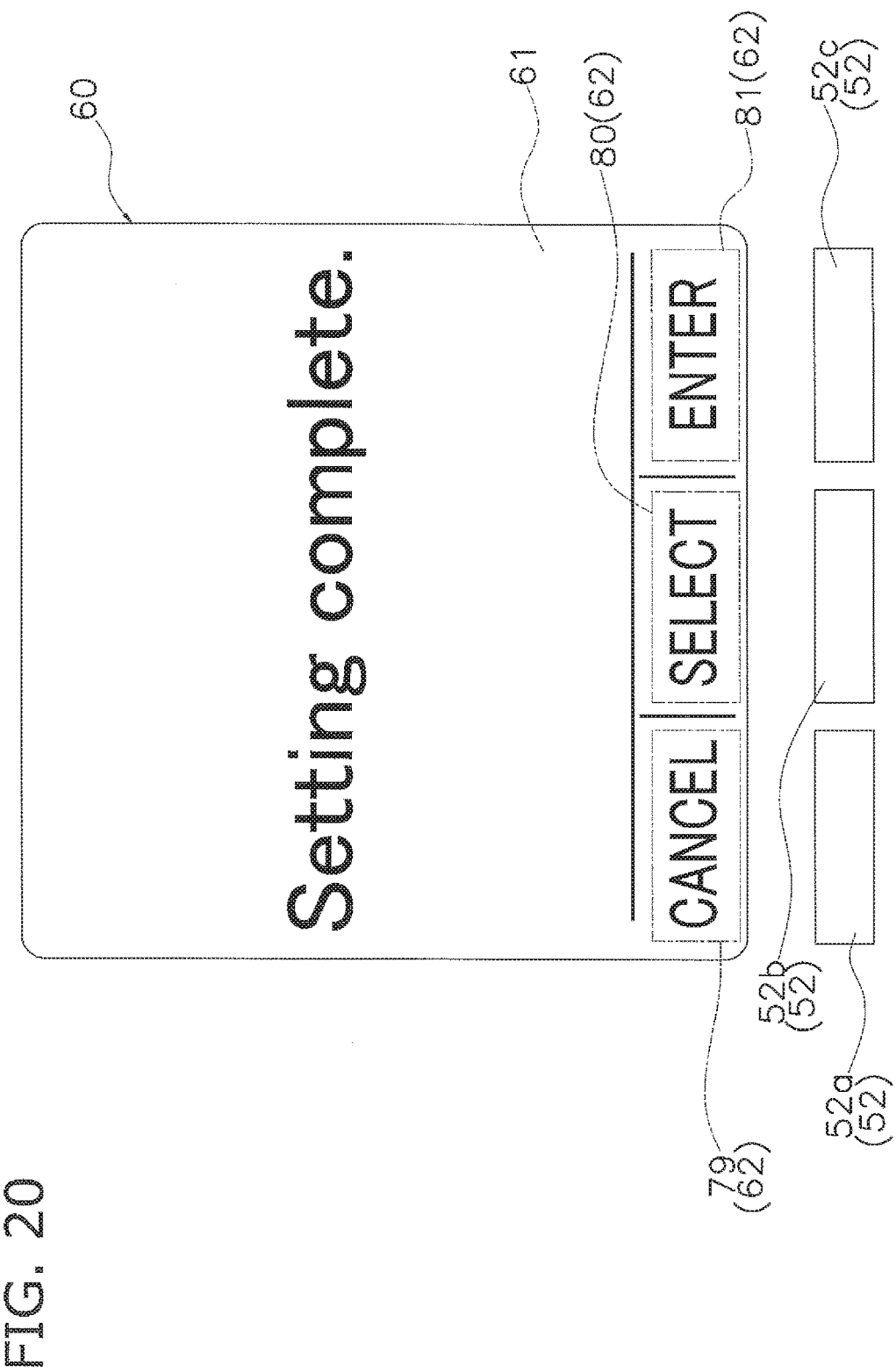
FIG. 20 is a schematic view showing an example of an image displayed on the liquid crystal display part during common function assignment mode.

The display controller 94 receives the signal outputted from the common function setting part 96, creates the predetermined display data signal, and outputs this signal to the liquid crystal display part 61. The liquid crystal display part 61 receives this display data signal, displays the words "Setting complete" in order to indicate to the user that the common function assignment is complete, displays the common function assigned to the F1 key 52*a* so as to be superimposed over the ninth touch input part 79, displays the common function assigned to the F2 key 52*b* so as to be superimposed over the tenth touch input part 80, and displays the common function assigned to the F3 key 52*c* so as to be superimposed over the eleventh touch input part 81, as shown in FIG. 20. FIG. 20 shows a state in which the second common function has been assigned to the F1 key 52*a*. This state is referred to as a fifth state of common function assignment mode in the description below.

When the predetermined time (e.g., three seconds) elapses after the fifth state of common function assignment mode has taken effect, the common function setting part 96 transitions back to the first state of common function assignment mode (see FIG. 16) in order to prompt the user to select a function key 52 (52*a*, 52*b*, or 52*c*) to make the next common function assignment.

When the common function setting part 96 is disconnected from the external instrument (the external storage device 110 or the like) in the interface 98 in any of the first through fifth states of common function assignment mode, the common function setting part recognizes the disconnection and transitions to standby mode.

(5) Touch Keys, Function Touch Keys

As described above, in any of the control modes except for common function assignment mode, words, graphics, or symbols (the first through eighth icons IC1 to IC8) individually associated with any of the plurality of set items are displayed in the touch screen 60 of the remote control device 30. Being combined with superimposed touch input parts (the first through eighth touch input parts 71 to 78), these first through eighth icons IC1 to IC8 are made to function as touch keys enacting predetermined functions by being touched. In other words, the touch screen 60 can be regarded as displaying a plurality (eight) of touch keys which are displayed by words, graphics, or symbols (the first through eighth icons IC1 to IC8) individually associated with any of the plurality of set items, during any of the control modes except for common function assignment mode. With the touch keys displayed on the touch screen 60 in this manner, a user can switch the operating state of the air conditioning system 100 and can perform various settings by intuitively operating the touch screen.

In the remote control device 30, the number of touch keys (eight) is greater than the number of function keys 52 (three). In other words, the number of function keys 52 is fewer than the number of touch keys. Therefore, the compactness and design of the remote control device 30 is not compromised as much due the greater number of function keys 52 (physical keys 50).

In the touch screen 60 of the remote control device 30, the ninth icon IC9, the tenth icon IC10, and the eleventh icon IC11, which are words for distinguishing the common functions assigned to the function keys 52, are displayed directly above each corresponding function key 52 during any of the control modes except for common function assignment mode, as described above. The user can thereby intuitively recognize the common functions assigned to the function keys 52.

Because the ninth icon IC9, the tenth icon IC10, or the eleventh icon IC11 is superimposed over the ninth touch input part 79, the tenth touch input part 80, or the eleventh touch input part 81, for users, it is realized that the common function assigned to the ninth touch input part 79 (the F1 key 52a), the tenth touch input part 80 (the F2 key 52b), or the eleventh touch input part 81 (the F3 key 52c) to be enacted by touching the ninth icon IC9, the tenth icon IC10, or the eleventh icon IC11. Specifically, being combined with the ninth touch input part 79, the tenth touch input part 80, or the eleventh touch input part 81, the ninth icon IC9, the tenth icon IC10, or the eleventh icon IC11 functions as the function touch key for enacting the same common function as the corresponding function key 52 by being touched.

(6) Characteristics (6-1)

In the above embodiment, the physical keys 50 include a smaller number (three) of function keys 52 (the F1 key 52a, the F2 key 52b, and the F3 key 52c) than the number (eight) of the touch keys (the first through eighth icons IC1 to IC8) of the touch screen 60. The function keys 52 are assigned the common functions that are generically utilized for switching the operating state.

The operator is thereby provided with various operating methods, rather than there being only one function available with each function key 52. As a result, it is possible to freely switch the operating state and/or implement the desired settings, even when a user operates the keys while wearing gloves, by operating the function keys 52 without operating the touch keys (touch input parts) of the touch screen 60. Consequently, it is restrained that operability become worse. Because the number of the function keys 52 is fewer than the number of touch keys of the touch screen 60, it is restrained that compactness and design become worse for increasing the number of function keys 52.

(6-2)

In the above embodiment, the liquid crystal display part 61 of the touch screen 60 performs the displays (function displays) of the ninth icon IC9, the tenth icon IC10, and the eleventh icon IC11, which are words for distinguishing the functions assigned to the function keys 52 directly above the function keys 52 (the F1 key 52a, the F2 key 52b, and the F3 key 52c). The operator can thereby easily discern the functions assigned to the function keys 52.

(6-3)

In the above embodiment, touching the ninth icon IC9, the tenth icon IC10, and the eleventh icon IC11 causes them to function as the function touch keys enacting the same functions as the corresponding function keys 52. The operator is thereby provided with various operating methods, and there is a greater operating degree of freedom.

(6-4)

In the above embodiment, the common function setting part 96 selects any of the common functions from the external storage device 110 and assigns the functions to the function keys 52. The user can thereby select the common functions assigned to the function keys 52 as desired.

(6-5)

In the above embodiment, the common function setting part 96 is connected with the external storage device 110 via the interface 98 as a connecting part for connecting external instruments. The assigning of the common functions to the function key 52 can thereby be performed easily.

(6-6)

In the above embodiment, the common function is either the first common function, the second common function, or the third common function, and the first through third common functions can all be intuitively understood by the operator. The operator can thereby operate the function keys 52 to easily switch the operating state and/or implement the desired settings.

(7) Modifications (7-1) Modification A

In the above embodiment, the remote control device 30 was applied to an air conditioning system 100 as a heat pump system, but no limitation is provided thereby. For example, the remote control device 30 may be applied to a water heater or a dehumidifier as a heat pump system. The remote control device 30 may also be applied to a ventilation device, an air purifier, or the like.

(7-2) Modification B

In the above embodiment, a so-called ceiling-embedded unit or ceiling-suspended unit was employed as the indoor unit 20, but no limitation is provided thereby; the indoor unit 20 may be, e.g., a wall-mounted unit or a floor-standing unit.

(7-3) Modification C

In the above embodiment, the remote control device 30 was connected with the indoor unit controller 22 of one indoor unit 20, but no limitation is provided thereby; the remote control device 30 may be connected with the indoor unit controllers 22 of a plurality of indoor units 20.

The remote control device 30 was also connected by the cable C2 to communicate with the indoor unit controller 22 of the indoor unit 20, but no limitation is provided thereby; the remote control device 30 may communicate wirelessly through infrared rays or the like. In such cases, a battery or another power source is preferably installed in the remote control device 30 to provide a power source to the components of the remote control device 30.

The remote control device 30 may also be connected with the outdoor unit controller rather than the indoor unit controller 22. In such cases, a signal from the remote control device 30 would be transmitted to the indoor unit controller 22 via the outdoor unit controller.

(7-4) Modification D

In the above embodiment, the remote control device 30 was employed as a remote control device. However, no limitation is provided thereby; the remote control device may be, e.g., a smartphone, a tablet PC, or another portable terminal.

(7-5) Modification E

In the above embodiment, the common function setting part 96 was installed in the remote control device controller 90. However, no limitation is provided thereby; the common function setting part 96 may be installed in an external instrument connected via the interface 98 and the cable C3.

(7-6) Modification F

In the above embodiment, when the common function is assigned to the function key 52, the common function setting part 96 selects any common function from the plurality of common functions stored in the external storage device 110, and assigns the function to each of the function key 52. However, no limitation is provided thereby; a configuration may be adopted in which a storage part storing a plurality of common functions is installed in the remote control device 30, and the common function setting part 96 selects one common function from the storage part and assigns the function to one of the function keys 52.

(7-7) Modification G

In the above embodiment, the display controller 94 of the remote control device controller 90 did not change the backlight color of the liquid crystal display part 61, but the display controller may be configured so as to change the backlight color in accordance with the operating state. For example, a control may be performed so as to set the backlight color to blue during operation in air-cooling mode, to red during operation in air-warming mode, and to green during operation in dehumidifying mode.

The liquid crystal display part 61 may be enabled to switch the backlight brightness incrementally among three or more levels, and may be configured so as to change the backlight brightness in accordance with the operating state. For example, when the air conditioning system 100 is in an operating state, a control may be performed during standby mode so as to increase backlight brightness as the rotational speed of the compressor increases (either as the set temperature during the air-cooling operation decreases or the set temperature during the air-warming operation increases), or as the power consumption of the air conditioning system 100 increases. When the air conditioning system 100 is in an operating state, a control may be performed during standby mode and set temperature switch mode so as to increase backlight brightness as the difference between the selected set temperature value and the current room temperature grows larger. Conventional techniques may be employed as appropriate as the means for detecting the rotational speed of the compressor, the power consumption and the room temperature.

(7-8) Modification H

In the above embodiment, the words for distinguishing the functions assigned to the function keys 52 were displayed as the ninth icon IC9, the tenth icon IC10, and the eleventh icon IC11 displayed on the liquid crystal display part 61. However, no limitation is provided thereby; graphics and/or symbols for distinguishing the functions respectively assigned to the function keys 52 may be displayed as the ninth icon IC9, the tenth icon IC10, and the eleventh icon IC11.

(7-9) Modification

In the above embodiment, any one of the first common function, the second common function, and the third common function was selected as the common function assigned to a function key 52. However, no limitation is provided thereby; e.g., a fourth common function for displaying help information to assist the user, or a fifth common function for selecting to start or end an energy conserving operation may be selected as the common function assigned to a function key 52.

Figure 21:
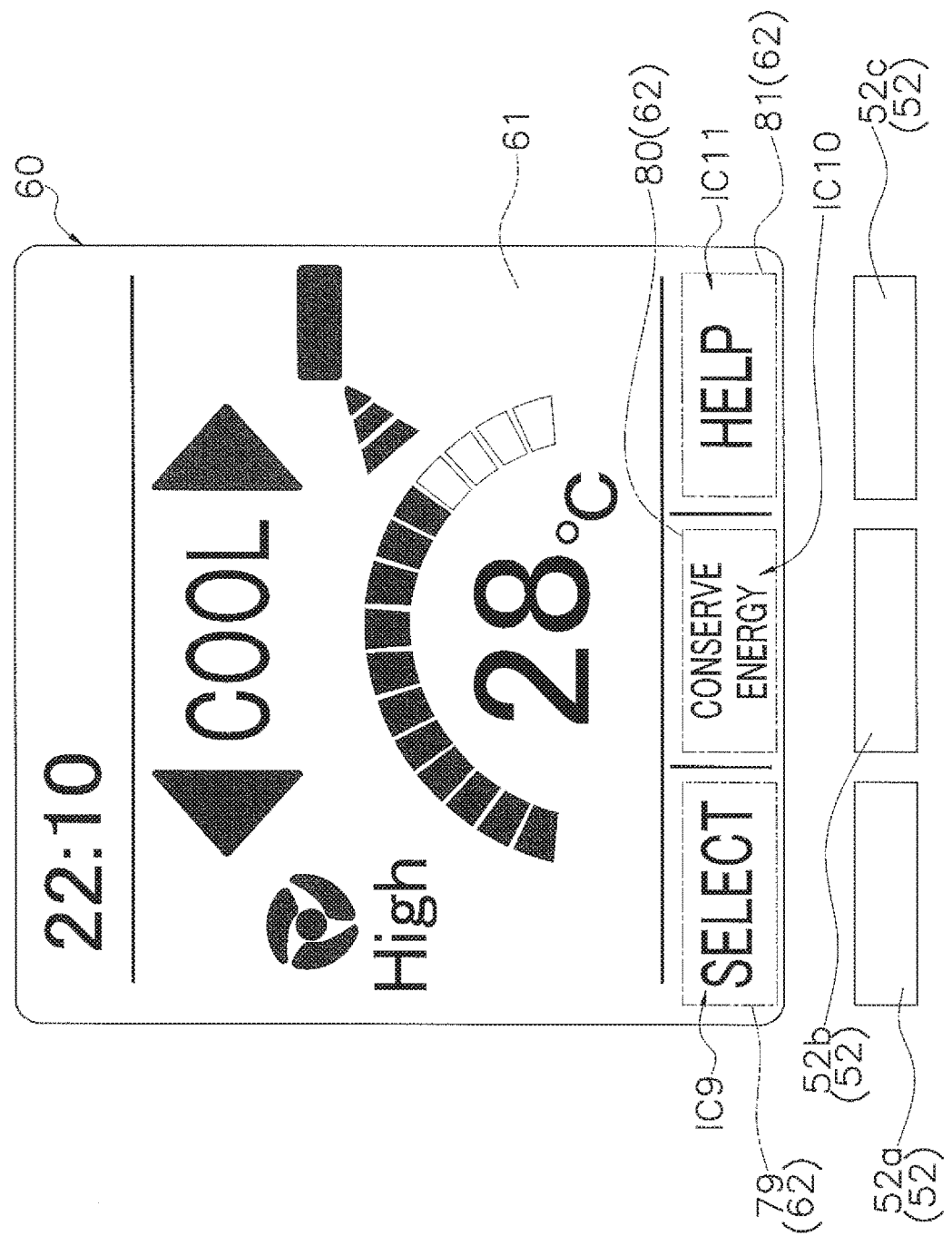
FIG. 21 is a schematic view showing an example of an image displayed on the liquid crystal display part during standby mode according to Modification I.

In such cases, during standby mode, a display such as the one in, e.g., FIG. 21 is shown in the liquid crystal display part 61. In FIG. 21, a fifth common function is assigned to the tenth touch input part and the F2 key 52b, and the words "CONSERVE ENERGY" indicating the fifth common function are displayed as the tenth icon IC10. The fourth common function is assigned to the eleventh touch input part and the F3 key 52c, and the word "HELP" indicating the fourth common function is displayed as the eleventh icon IC11.

The help information mentioned in this modification is, e.g., detailed information pertaining to the remote control operation displayed for the user. The energy conserving operation is, e.g., a power conserving operation, in which control is performed to reduce power consumption in accordance with the operating conditions.

(7-10) Modification J

Figure 22:
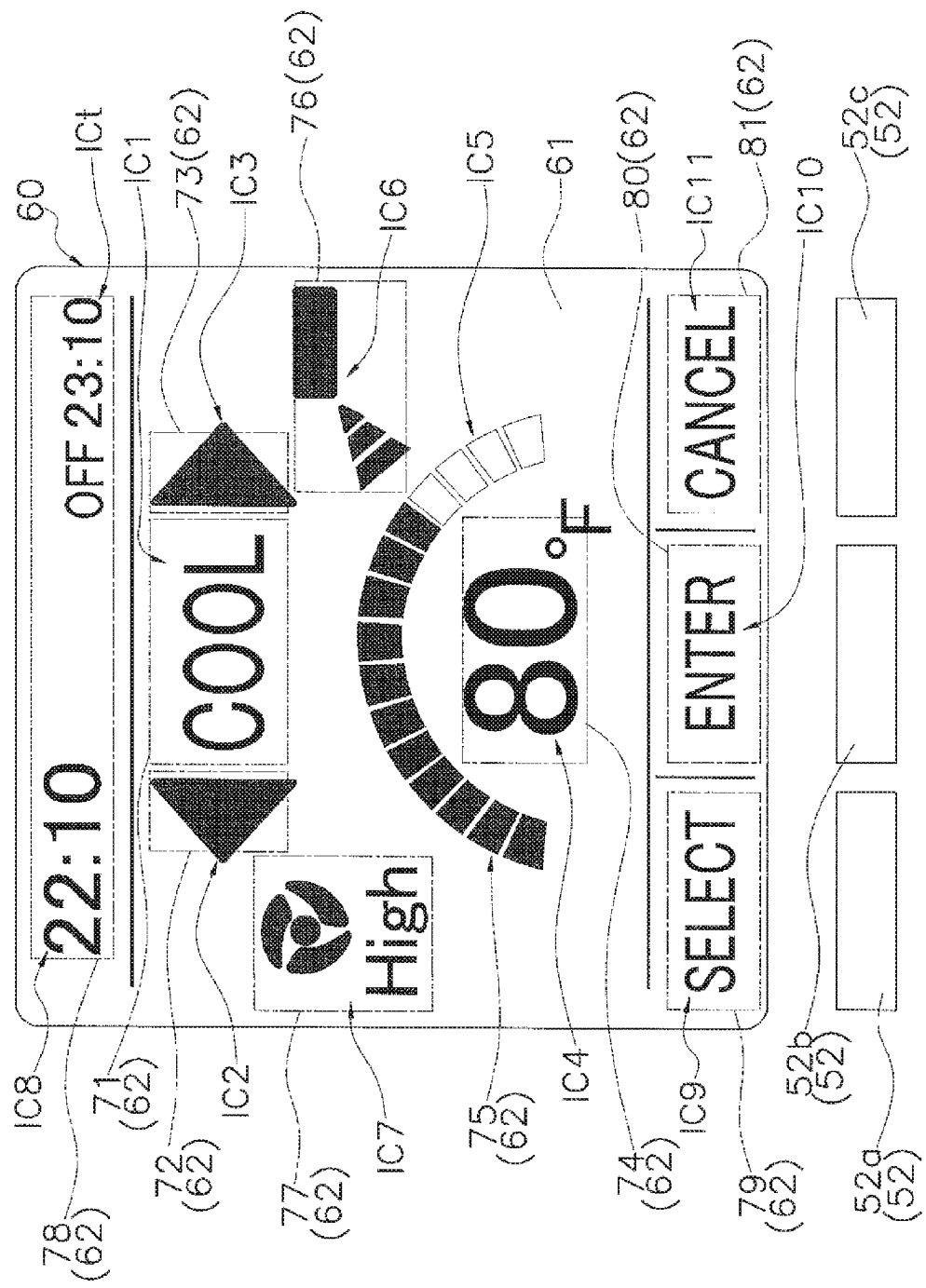
FIG. 22 is a schematic view showing an example of an image displayed on the liquid crystal display part during standby mode according to Modification J.

The words displayed on the various icons (the first icon IC1, the seventh icon IC7, the ninth through eleventh icons IC9 to IC11, the timer icon ICt, etc.) on the liquid crystal display part 61 may be in any language. For example, the display may be in English as shown in FIG. 22. In FIG. 22, words written in English are displayed in the first icon IC1, the seventh icon IC7, the ninth through eleventh icons IC9 to IC11, and the timer icon ICt, and the set temperature is displayed in the fourth icon IC4 in Fahrenheit rather than Celsius.

(7-11) Modification K

In the above embodiment, the fifth icon IC5 displayed on the liquid crystal display part 61 was displayed with the quadrangle corresponding to the set temperature during operation colored in, and the quadrangles to the left thereof colored in as well. However, no limitation is provided thereby; the fifth icon IC5 may be displayed in a manner such as that shown in, e.g. FIG. 23.

Figure 23:
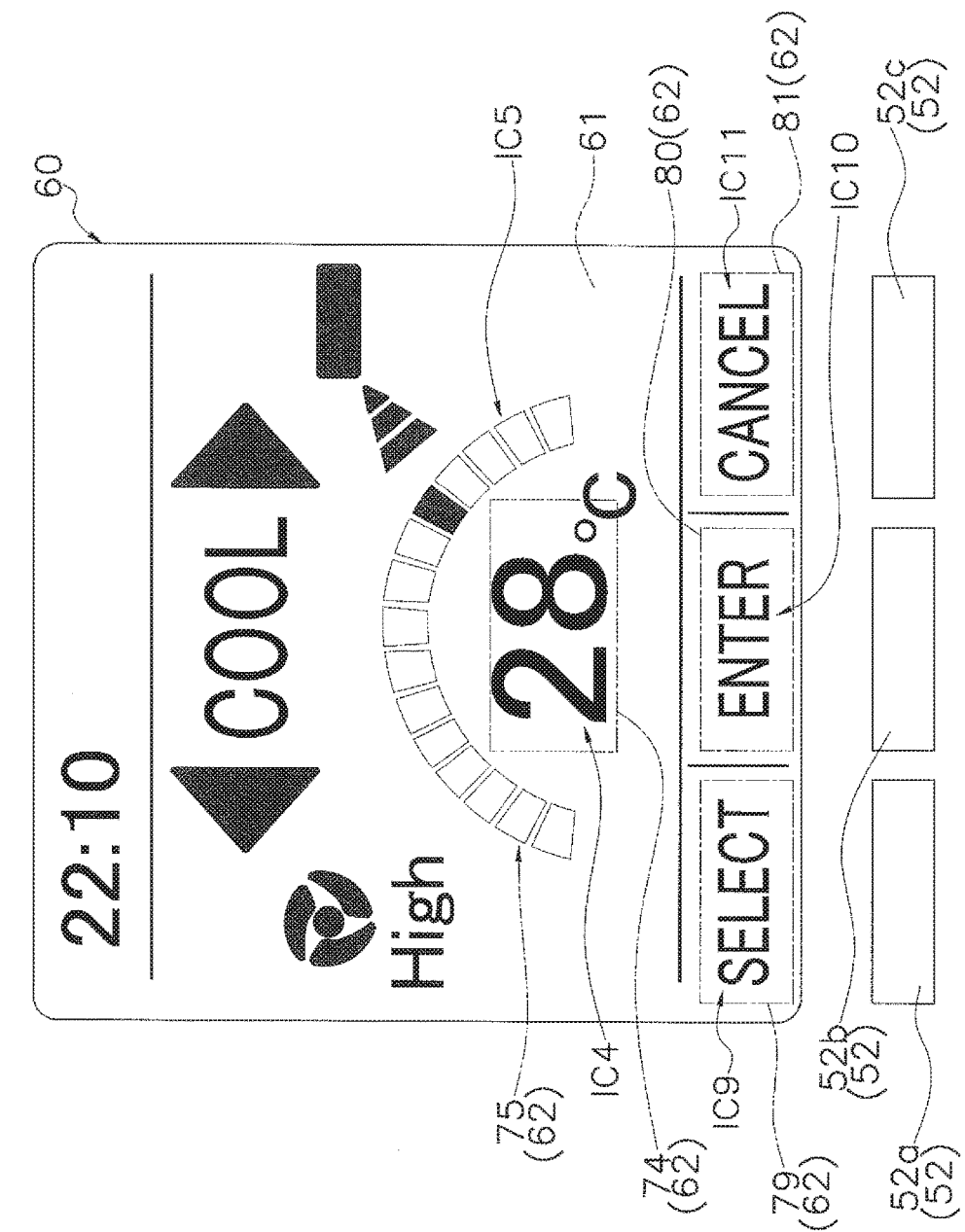
FIG. 23 is a schematic view showing an example of an image displayed on the liquid crystal display part during standby mode according to Modification K.

In FIG. 23, to show that the set temperature has been set to 28 degrees, the eleventh quadrangle from the left (superimposed over the fifth touch input part 75k) is displayed as colored in, and only the contours of the other quadrangles are displayed.

(7-12) Modification L

Figure 24:
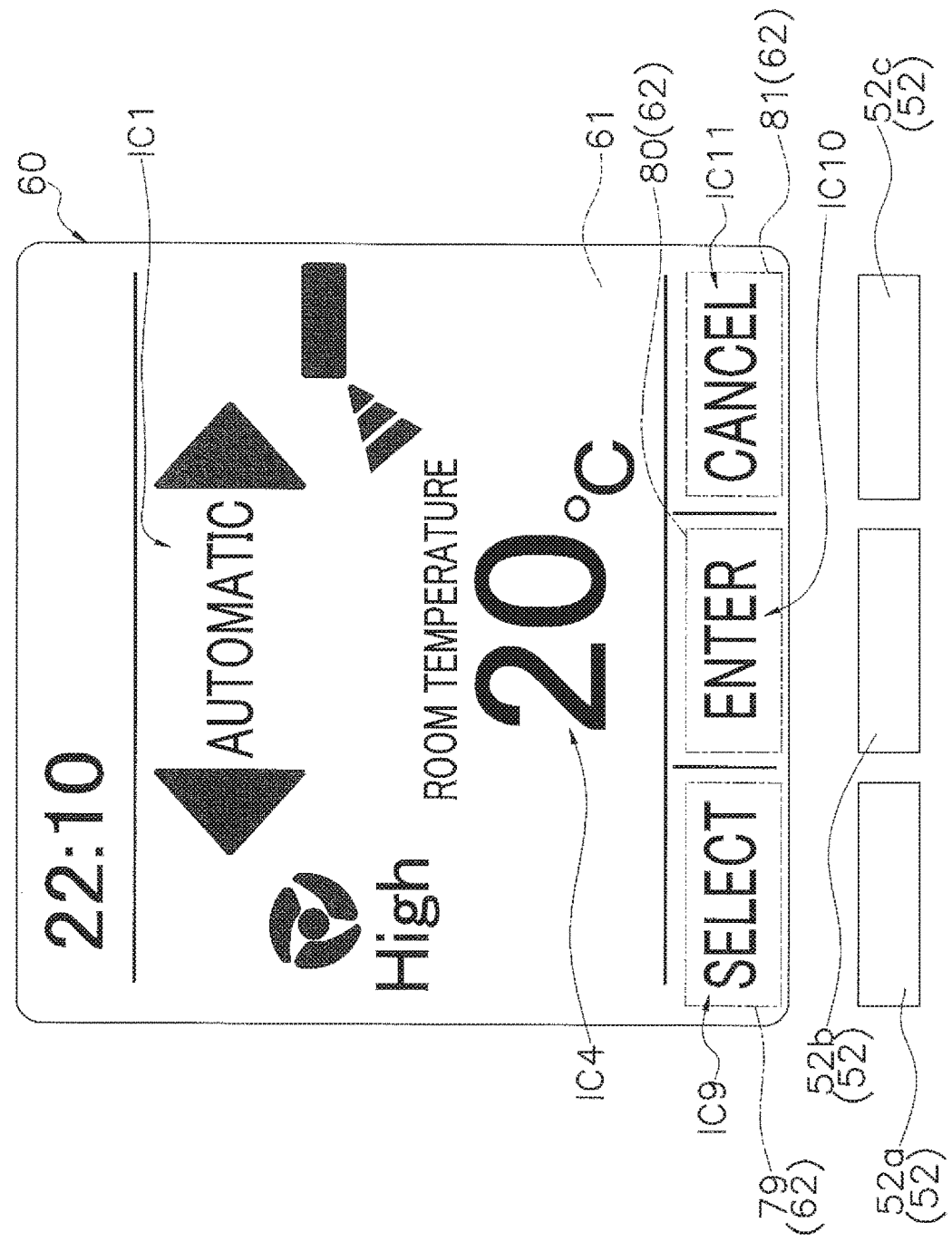
FIG. 24 is a schematic view showing an example of an image displayed on the liquid crystal display part during standby mode according to Modification L.

In the above embodiment, air-cooling mode, air-warming mode, and dehumidifying mode were employed as the operating modes of the air conditioning system 100. However, no limitation is provided thereby; an automatic operating mode may be added as the operating mode. In such cases, the liquid crystal display part 61 may have a display such as that shown in, e.g., FIG. 24 during automatic operation mode. In FIG. 24, the word "AUTOMATIC" indicating automatic operation mode is displayed as the first icon IC1. The current room temperature rather than the set temperature is displayed as the fourth icon IC4. Above the fourth icon IC4, the word "ROOM TEMPERATURE" is displayed instead of the fifth icon IC5.

The means for detecting room temperature may be configured by, e.g., a thermistor or other temperature detector installed in the remote control device 30 and connected with the remote control device controller 90. The automatic operation mode mentioned in this modification is the operating mode for switching automatically among air-cooling mode, air-warming mode, and dehumidifying mode in accordance with the room temperature conditions, and this switch is performed by, e.g., the indoor unit controller 22.

(7-13) Modification M

In the above embodiment, the remote control device 30 was employed as the remote control device, but no limitation is provided thereby; e.g., the remote control device 30a shown in FIG. 25 may be employed.

In the remote control device 30a, the function keys 52 (52a, 52b, and 52c) are provided above the touch screen 60 rather than below the touch screen 60. The ninth touch input part 79 and the ninth icon IC9 of the touch panel 62 are arranged directly below the F1 key 52a. The tenth touch input part 80 and the tenth icon IC10 are arranged directly below the F2 key 52b. The eleventh touch input part 81 and the eleventh icon IC11 are arranged directly below the F3 key 52c. The eighth touch input part 78, the eighth icon IC8, and the timer icon ICt are arranged in the bottom-end vicinity of the liquid crystal display part 61. The rest of the configuration of the remote control device 30a is substantially the same as the remote control device 30.

(7-14) Modification N

In the above embodiment, the F1 key 52a, the F2 key 52b, and the F3 key 52c are installed as function keys 52. However, no limitation is provided thereby; the function keys 52 may be any combination of keys. For example, four function keys 52 may be installed as in the remote control device 30b shown in FIG. 26.

In the remote control device 30b, the function keys 52 further include a fourth function key 52d (referred to below as the F4 key 52d). The F4 key 52d is installed to the right of the F3 key 52c. When the F4 key 52d is pushed, an F4 input signal is outputted to the remote control device controller 90 and stored in the second storage part 92.

The touch panel 62 further includes a twelfth touch input part 82, and the twelfth touch input part 82 is installed to the right of the eleventh touch input part 81 and directly above the F4 key 52d. When the twelfth touch input part 82 is inputted, the touch panel 62 outputs a twelfth touch signal to the remote control device controller 90 and stores the signal in the second storage part 92.

Words (referred to below as a twelfth icon IC12) indicating the common function assigned to the F4 key 52d are displayed in the liquid crystal display part 61 so as to be superimposed over the twelfth touch input part 82 (i.e., at directly above the F4 key 52d).

In the remote control device 30b, a fifth common function, which selects to start or end the energy conserving operation, is assigned to the F4 key 52d by correlating the F4 input signal and the fifth common function in the control program of the remote control device controller 90. Specifically, the remote control device 30b is configured so as to enact the fifth common function when the F4 key 52d is pushed. The words "CONSERVE ENERGY" indicating the fifth common function are accordingly displayed as the twelfth icon IC12.

In the control modes of the remote control device 30b except for common function assignment mode, the twelfth touch signal is defined as the same signal as the F4 input signal. Consequently, in the control modes except for common function assignment mode, the F4 key 52d is regarded as pushed when the twelfth touch input part 82 is touched. Specifically, in the control modes except for common function assignment mode, the same fifth common function as the F4 key 52d can be considered to be assigned to the twelfth touch input part 82. In other words, in the remote control device 30h, the twelfth icon IC12, combined with the twelfth touch input part 82, functions as the function touch key that, when touched, enacts the same common function as the corresponding function key 52.

The lateral widths of the function keys 52 (52a, 52b, 52c, and 52d) and the ninth through twelfth touch input parts 79 to 82 in the remote control device 30b are less than those of the function keys 52 and the ninth through eleventh touch input parts 79 to 81 installed in the remote control device 30. The rest of the configuration and other features of the remote control device 30b are substantially the same as the remote control device 30.

The present invention can be utilized in a remote control device of a heat pump system.

What is claimed is:

1. A remote control device of a heat pump system useable to switch an operating state of the heat pump system, the remote control device comprising:
   a touch screen;
   physical keys provided separately from the touch screen, the physical keys including at least two function keys; and
   a common function setting part configured and arranged to assign a plurality of different common functions to the function keys,
   the touch screen being configured and arranged to display a plurality of touch keys displayed by words, graphics, or symbols associated separately with any of a plurality of set items,
   a number of the function keys being fewer than a number of the touch keys,
   the plurality of different common functions being stored in a storage part and utilized when the operating state is switched, and
   the common function setting part being further configured and arranged
      to allow a user to select any one of the function keys to which any one of the plurality of different common functions is to be assigned,
      to display the plurality of different common functions on the touch screen so as to allow the user to select any one of the plurality of different common functions, and
      to assign the selected common function to the selected function key.

2. The remote control device of the heat pump system according to claim 1, wherein
   the storage part is an external storage device provided to an exterior; and
   the common function setting part is connected with the external storage device via a connecting part connecting the external storage device.

3. The remote control device of the heat pump system according to claim 1, wherein
   the common function is any of
      a first common function useable to enter selection of the set item,
      a second common function useable to cancel selection of the set item,
      a third common function useable to move from the selected set item to another set item, a fourth common function useable to display help information to assist a user, and a fifth common function useable to start or end an energy conserving operation.

* * * * *